United States Patent
Lin et al.

(10) Patent No.: US 9,602,731 B2
(45) Date of Patent: Mar. 21, 2017

(54) IMAGE CAPTURING LENS ASSEMBLY, IMAGE CAPTURING DEVICE AND VEHICLE PHOTOGRAPHING TERMINAL

(71) Applicant: LARGAN Precision Co., Ltd., Taichung (TW)

(72) Inventors: Cheng-Chen Lin, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 382 days.

(21) Appl. No.: 14/196,621

(22) Filed: Mar. 4, 2014

(65) Prior Publication Data

US 2015/0207998 A1 Jul. 23, 2015

(30) Foreign Application Priority Data

Jan. 17, 2014 (TW) .............................. 103101848 A

(51) Int. Cl.
| | |
|---|---|
| G02B 13/18 | (2006.01) |
| G02B 3/02 | (2006.01) |
| G02B 9/62 | (2006.01) |
| H04N 5/232 | (2006.01) |
| G02B 13/00 | (2006.01) |
| G02B 13/04 | (2006.01) |

(52) U.S. Cl.
CPC ........... *H04N 5/23296* (2013.01); *G02B 9/62* (2013.01); *G02B 13/0045* (2013.01); *G02B 13/04* (2013.01)

(58) Field of Classification Search
CPC .............................. G02B 13/0045; G02B 9/62
USPC .......................... 359/708, 713, 752, 756, 761
See application file for complete search history.

(56) References Cited

U.S. PATENT DOCUMENTS

| | | | |
|---|---|---|---|
| 4,867,546 A | 9/1989 | Nishioka et al. | |
| 5,663,836 A | 9/1997 | Ogata | |
| 5,691,850 A | 11/1997 | Arisaka | |
| 6,867,933 B2 | 3/2005 | Matsusaka | |
| 8,335,043 B2 | 12/2012 | Huang | |
| 2014/0009844 A1* | 1/2014 | Tsai | ......................... G02B 9/62 359/713 |
| 2014/0029115 A1 | 1/2014 | Liao et al. | |

FOREIGN PATENT DOCUMENTS

| | | |
|---|---|---|
| CN | 202886721 U | 4/2013 |
| JP | 2001066523 A | 3/2001 |
| JP | 2004029282 A | 1/2004 |
| JP | 2004354572 A | 12/2004 |

* cited by examiner

*Primary Examiner* — William Choi
(74) *Attorney, Agent, or Firm* — Maschoff Brennan

(57) ABSTRACT

An image capturing lens assembly includes, in order from an object side to an image side, a first lens element, a second lens element, a third lens element, a fourth lens element, a fifth lens element, and a sixth lens element. The first lens element with negative refractive power has an image-side surface being concave in a paraxial region thereof. The second and third lens elements have refractive power. The fourth lens element has positive refractive power. The fifth lens element with negative refractive power has an object-side surface being concave in a paraxial region thereof. The sixth lens element with refractive power has an object-side surface being convex in a paraxial region thereof and an image-side surface being concave in a paraxial region thereof. The image capturing lens assembly has a total of six lens elements with refractive power.

24 Claims, 15 Drawing Sheets

IMAGE CAPTURING LENS ASSEMBLY, IMAGE CAPTURING DEVICE AND VEHICLE PHOTOGRAPHING TERMINAL

RELATED APPLICATIONS

This application claims priority to Taiwan Application Serial Number 103101848, filed Jan. 17, 2014, which is incorporated by reference herein in its entirety.

BACKGROUND

1. Technical Field

The present disclosure relates to an image capturing lens assembly, an image capturing device and a vehicle photographing terminal. More particularly, the present disclosure relates to a compact image capturing lens assembly and an image capturing device applicable to a vehicle photographing terminal.

2. Description of Related Art

In recent years, vehicle recording cameras, such as dash-cams are becoming more and more popular. The vehicle recording cameras enable drivers to provide video evidence from when they get involved in an accident. Furthermore, the rear-view cameras enable drivers to reverse their vehicles easier and avoid accidents.

A conventional optical system employed in a vehicle recording camera mainly adopts a structure with five or less lens elements. However, the conventional optical systems are not favorable for resolving power. Moreover, the surface shape of the lens elements and arrangement of refractive powers are also not favorable for correcting image distortion in a peripheral region and sufficient illumination. As a result, since the vehicle recording cameras focus on the image quality, the conventional optical system cannot satisfy this requirement.

SUMMARY

According to one aspect of the present disclosure, an image capturing lens assembly includes, in order from an object side to an image side, a first lens element, a second lens element, a third lens element, a fourth lens element, a fifth lens element, and a sixth lens element. The first lens element with negative refractive power has an image-side surface being concave in a paraxial region thereof. The second lens element has refractive power. The third lens element has refractive power. The fourth lens element has positive refractive power, wherein an object-side surface and an image-side surface of the fourth lens element are aspheric, and the fourth lens element is made of plastic material. The fifth lens element with negative refractive power has an object-side surface being concave in a paraxial region thereof, wherein both of the object-side surface and an image-side surface of the fifth lens element are aspheric. The sixth lens element with refractive power has an object-side surface being convex in a paraxial region thereof and an image-side surface being concave in a paraxial region thereof, wherein the image-side surface of the sixth lens element has at least one inflection point in an off-axis region thereof, and both of an object-side surface and the image-side surface of the sixth lens element are aspheric. The image capturing lens assembly has a total of six lens elements with refractive power. At least three lens elements among the first through the sixth lens elements of the image capturing lens assembly are made of plastic material.

According to another aspect of the present disclosure, an image capturing device includes the image capturing lens assembly according to the aforementioned aspect and an image sensor.

According to still another aspect of the present disclosure, a vehicle photographing terminal includes the image capturing device according to the aforementioned aspect.

According to yet another aspect of the present disclosure, an image capturing lens assembly includes, in order from an object side to an image side, a first lens element, a second lens element, a third lens element, a fourth lens element, a fifth lens element, and a sixth lens element. The first lens element with negative refractive power has an image-side surface being concave in a paraxial region thereof. The second lens element with refractive power has an image-side surface being convex in a paraxial region thereof. The third lens element has refractive power. The fourth lens element has positive refractive power. The fifth lens element with negative refractive power has an object-side surface being concave in a paraxial region thereof, wherein both of the object-side surface and an image-side surface of the fifth lens element are aspheric. The sixth lens element with refractive power has an object-side surface being convex in a paraxial region thereof and an image-side surface being concave in a paraxial region thereof, wherein both of the image-side surface of the sixth lens element has at least one inflection point in an off-axis region thereof, and an object-side surface and the image-side surface of the sixth lens element are aspheric. The image capturing lens assembly has a total of six lens elements with refractive power. When a focal length of the image capturing lens assembly is f, and a curvature radius of the image-side surface of the sixth lens element is R12, the following condition is satisfied:

$$0.25 < f/R12 < 1.25.$$

According to still yet another aspect of the present disclosure, an image capturing device includes the image capturing lens assembly according to the foregoing aspect and an image sensor.

According to a further aspect of the present disclosure, a vehicle photographing terminal includes the image capturing device according to the foregoing aspect.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
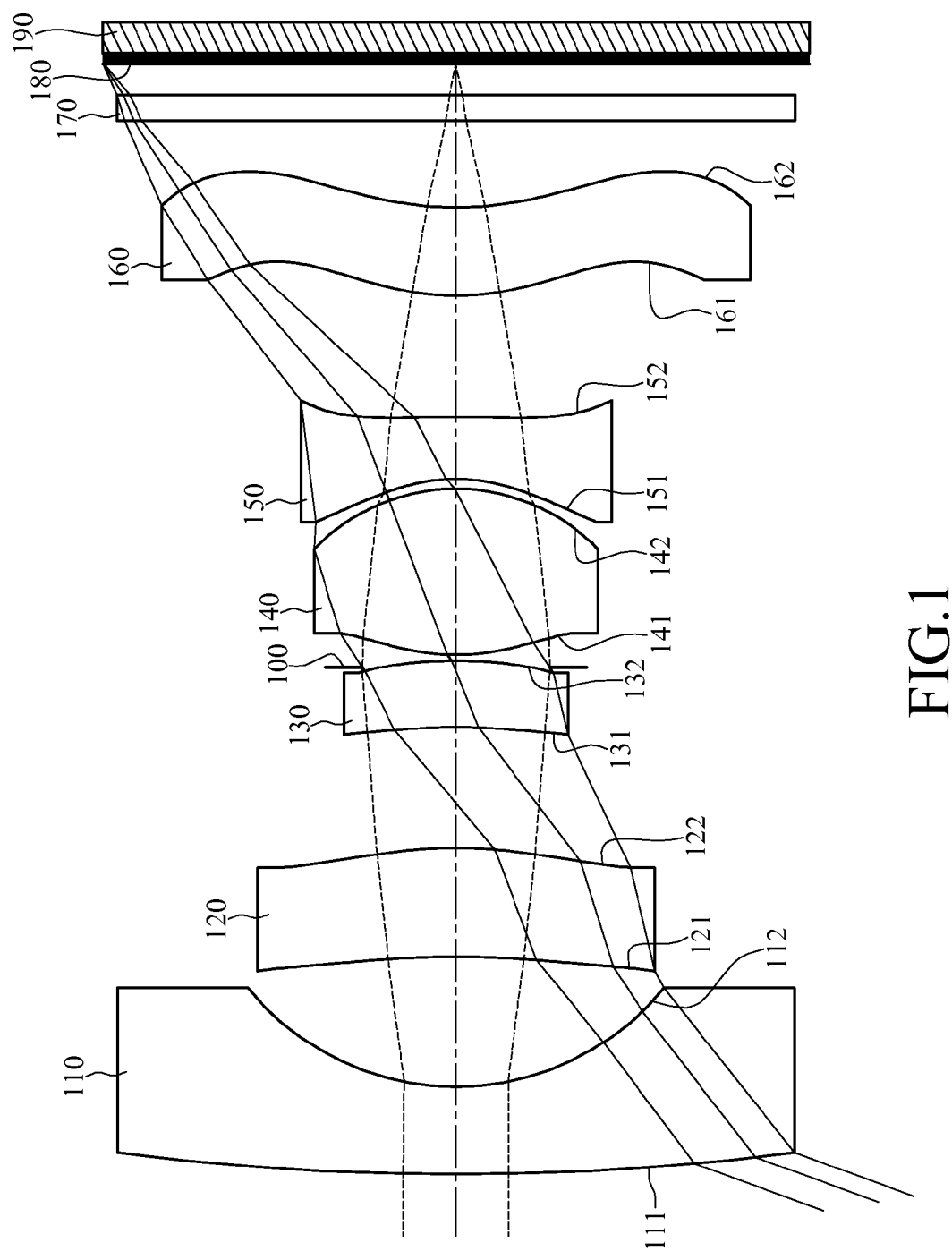
FIG. 1 is a schematic view of an image capturing device according to the 1st embodiment of the present disclosure.

An image capturing lens assembly includes, in order from an object side to an image side, a first lens element, a second lens element, a third lens element, a fourth lens element, a fifth lens element, and a sixth lens element. The image capturing lens assembly has a total of six lens elements with refractive power.

The first lens element has negative refractive power, so that it is favorable for enlarging the field of view to capture more of the image scene. The first lens element can have an object-side surface being convex in a paraxial region thereof and an image-side surface being concave in a paraxial region thereof, so that it is favorable for reducing the astigmatism.

The second lens element can have an object-side surface being concave in a paraxial region thereof and an image-side surface being convex in a paraxial region thereof. Therefore, it is favorable for correcting the astigmatism.

The fourth lens element has positive refractive power. Therefore, it is favorable for reducing spherical aberration.

The fifth lens element with negative refractive power can have an object-side surface being concave in a paraxial region thereof and an image-side surface being convex in a paraxial region thereof. Therefore, it is favorable for improving the resolving power. Moreover, the image-side surface of the fifth lens element can have at least one inflection point in an off-axis region thereof; therefore, it is favorable for effectively reducing the incident angle of the off-axis on the image plane so as to improve the responding efficiency of the image sensor.

The sixth lens element can have an object-side surface being convex in a paraxial region thereof and an image-side surface being concave in a paraxial region thereof. Therefore, it is favorable for the principal point being positioned away from the image plane so as to reduce the total track length of the image capturing lens assembly. In addition, the image-side surface of the sixth lens element has at least one inflection point in an off-axis region thereof, so that it is favorable for correcting the image distortion in a peripheral region thereof and improving the relative illumination.

When a focal length of the image capturing lens assembly is f, and a curvature radius of the image-side surface of the sixth lens element is R12, the following condition is satisfied: 0.25<f/R12<1.25. Therefore, it is favorable for reducing the back focal length of the image capturing lens assembly.

When a focal length of the first lens element is f1, and a curvature radius of the object-side surface of the second lens element is R3, the following condition is satisfied: |f1/R3|<1.4. Therefore, it is favorable for improving the illumination.

When a focal length of the second lens element is f2, and a focal length of the third lens element is f3, the following condition is satisfied: |f2/f3|<2.0. Therefore, it is favorable for balancing the refractive powers of the second and the third lens elements so as to correct the aberration.

When a maximal field of view of the image capturing lens assembly is FOV, the following condition is satisfied: 120 deg.≤FOV<200 deg. Therefore, the image capturing lens assembly can have larger field of view so as to obtain more of the image scene.

When the focal length of the first lens element is f1, the focal length of the second lens element is f2, and the focal length of the third lens element is f3, the following condition is satisfied: |f1/f2|+|f1/f3|<1.0. Therefore, it is favorable for balancing the refractive powers of the image capturing lens assembly.

When an axial distance between the image-side surface of the sixth lens element and an image plane is BL, and the focal length of the image capturing lens assembly is f, the following condition is satisfied: BL/f<1.0. Therefore, it is favorable for maintaining a proper back focal length.

When a curvature radius of the object-side surface of the sixth lens element is R11, and the curvature radius of the image-side surface of the sixth lens element is R12, the following condition is satisfied: −0.40<(R11−R12)/(R11+R12)<0.40. Therefore, it is favorable for effectively correcting the astigmatism.

According to the image capturing lens assembly of the present disclosure, the lens elements thereof can be made of glass or plastic material. When the lens elements are made of glass material, the distribution of the refractive power of the image capturing lens assembly may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the image capturing lens assembly can also be reduced.

According to the image capturing lens assembly of the present disclosure, each of an object-side surface and an image-side surface has a paraxial region and an off-axis region. The paraxial region refers to the region of the surface where light rays travel close to the optical axis, and the off-axis region refers to the region of the surface where light rays travel away from the optical axis. Particularly, when the lens element has a convex surface, it indicates that the surface is convex in the paraxial region thereof; when the lens element has a concave surface, it indicates that the surface is concave in the paraxial region thereof.

According to the image capturing lens assembly of the present disclosure, the image capturing lens assembly can include at least one stop, such as an aperture stop, a glare stop or a field stop. Said glare stop or said field stop is for eliminating the stray light and thereby improving the image resolution thereof.

According to the image capturing lens assembly of the present disclosure, an aperture stop is configured as a middle stop. The middle stop disposed between the first lens element and the image plane is favorable for enlarging the field of view of the image capturing lens assembly and thereby provides a wider field of view for the same.

According to the present disclosure, an image capturing device is provided. The image capturing device includes the image capturing lens assembly according to the aforementioned image capturing lens assembly of the present disclosure, and an image sensor, wherein the image sensor is disposed on or near an image plane of the aforementioned image capturing lens assembly. In some embodiments, the image capturing device can further include a barrel member, a holding member or a combination thereof.

Figure 15:
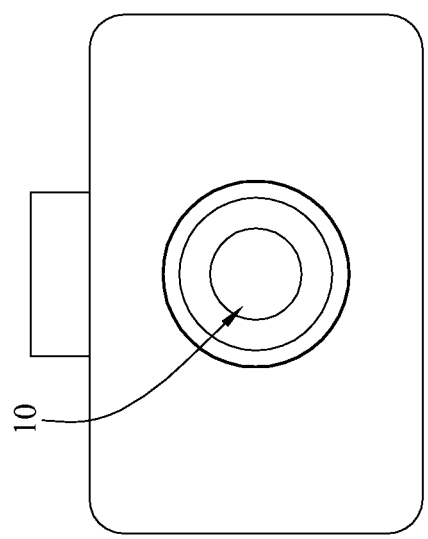
FIG. 15 shows a vehicle photographing terminal according to the 1st embodiment.

In FIG. 15, an image capturing device 10 may be installed in but not limited to a vehicle photographing terminal. In some embodiments, the vehicle photographing terminal can further include, but not limited to, display, a control unit, a random access memory unit (RAM), a read only memory unit (ROM) or a combination thereof.

According to the above description of the present disclosure, the following specific embodiments are provided for further explanation.

1st Embodiment

Figure 2:
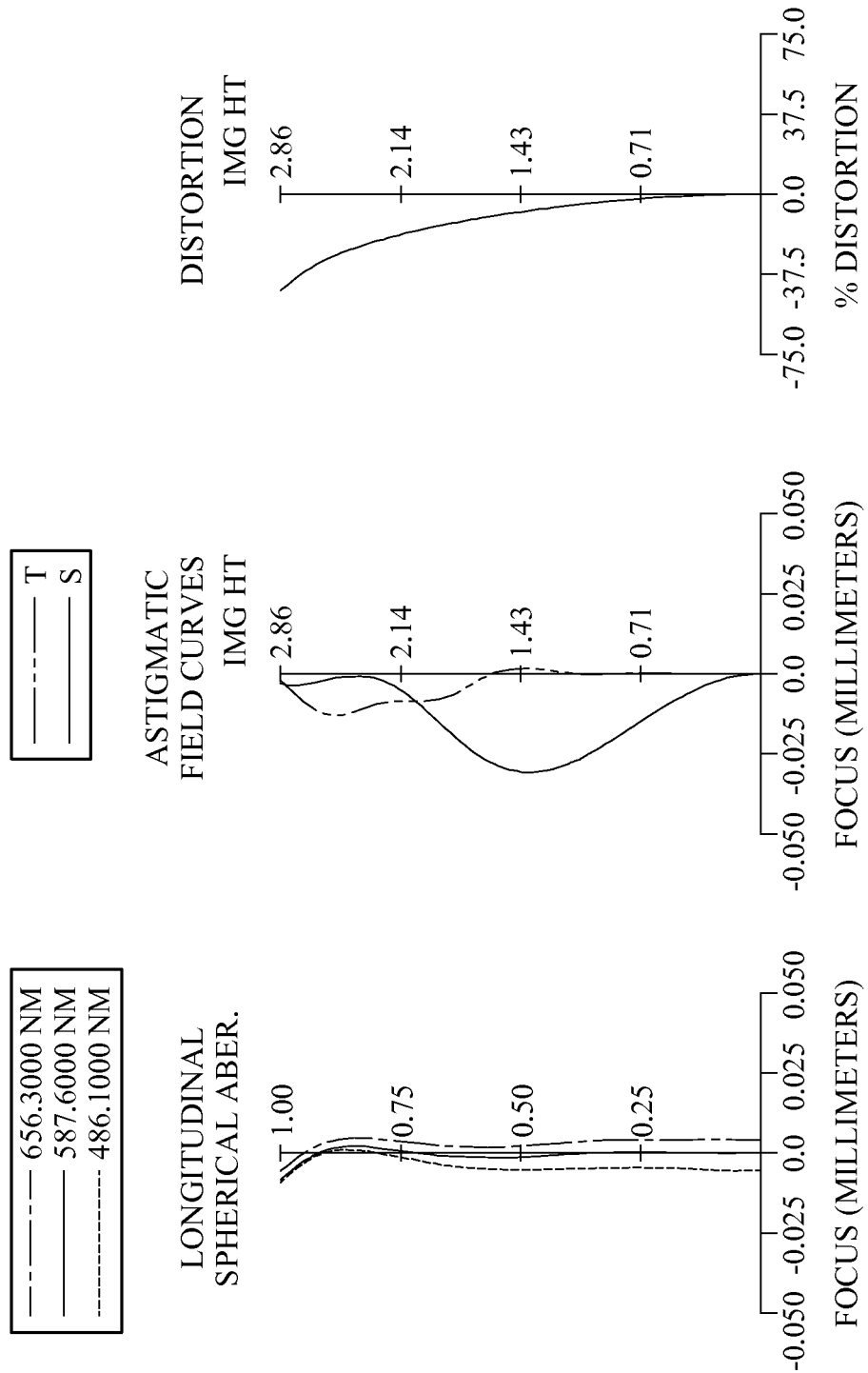
FIG. 2 shows spherical aberration curves, astigmatic field curves and a distortion curve of the image capturing device according to the 1st embodiment.

FIG. 1 is a schematic view of an image capturing device according to the 1st embodiment of the present disclosure. FIG. 2 shows, in order from left to right, spherical aberration curves, astigmatic field curves and a distortion curve of the image capturing device according to the 1st embodiment. In FIG. 1, the image capturing device includes the image capturing lens assembly (not otherwise herein labeled) of the present disclosure and an image sensor 190. The image capturing lens assembly includes, in order from an object side to an image side, a first lens element 110, a second lens element 120, a third lens element 130, an aperture stop 100, a fourth lens element 140, a fifth lens element 150, a sixth lens element 160, an IR-cut filter 170 and an image plane 180, wherein the image capturing lens assembly has a total of six lens elements (110-160) with refractive power.

The first lens element 110 with negative refractive power has an object-side surface 111 being convex in a paraxial region thereof and an image-side surface 112 being concave in a paraxial region thereof. The first lens element 110 is made of glass material.

The second lens element 120 with positive refractive power has an object-side surface 121 being concave in a paraxial region thereof and an image-side surface 122 being convex in a paraxial region thereof. The second lens element 120 is made of plastic material and has the object-side surface 121 and the image-side surface 122 being both aspheric.

The third lens element 130 with positive refractive power has an object-side surface 131 being concave in a paraxial region thereof and an image-side surface 132 being convex in a paraxial region thereof. The third lens element 130 is made of plastic material and has the object-side surface 131 and the image-side surface 132 being both aspheric.

The fourth lens element 140 with positive refractive power has an object-side surface 141 being convex in a paraxial region thereof and an image-side surface 142 being convex in a paraxial region thereof. The fourth lens element 140 is made of plastic material and has the object-side surface 141 and the image-side surface 142 being both aspheric.

The fifth lens element 150 with negative refractive power has an object-side surface 151 being concave in a paraxial region thereof and an image-side surface 152 being convex in a paraxial region thereof, wherein the image-side surface 152 of the fifth lens element 150 has at least one inflection point in an off-axis region thereof. The fifth lens element 150 is made of plastic material and has the object-side surface 151 and the image-side surface 152 being both aspheric.

The sixth lens element 160 with positive refractive power has an object-side surface 161 being convex in a paraxial region thereof and an image-side surface 162 being concave in a paraxial region thereof, wherein the image-side surface 162 of the sixth lens element 160 has at least one inflection point in an off-axis region thereof. The sixth lens element 160 is made of plastic material and has the object-side surface 161 and the image-side surface 162 being both aspheric.

The IR-cut filter 170 is made of glass and located between the sixth lens element 160 and the image plane 180, and will not affect the focal length of the image capturing lens assembly. The image sensor 190 is disposed on or near the image plane 180 of the image capturing lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_{i}(Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the image capturing lens assembly of the image capturing device according to the 1st embodiment, when a focal length of the image capturing lens assembly is f, an f-number of the image capturing lens assembly is Fno, and half of a maximal field of view of the image capturing lens assembly is HFOV, these parameters have the following values: f=2.00 mm; Fno=2.35; and HFOV=70.0 degrees.

In the image capturing lens assembly of the image capturing device according to the 1st embodiment, when a curvature radius of the object-side surface 161 of the sixth lens element 160 is R11, and a curvature radius of the image-side surface 162 of the sixth lens element 160 is R12, the following condition is satisfied: (R11−R12)/(R11+R12)=−0.17.

In the image capturing lens assembly of the image capturing device according to the 1st embodiment, when a focal length of the first lens element 110 is f1, and a curvature radius of the object-side surface 121 of the second lens element 120 is R3, the following condition is satisfied: |f1/R3|=0.47.

In the image capturing lens assembly of the image capturing device according to the 1st embodiment, when the focal length of the image capturing lens assembly is f, and the curvature radius of the image-side surface 162 of the sixth lens element 160 is R12, the following condition is satisfied: f/R12=0.72.

In the image capturing lens assembly of the image capturing device according to the 1st embodiment, when a focal length of the second lens element 120 is f2, and a focal length of the third lens element 130 is f3, the following condition is satisfied: |f2/f3|=0.01.

In the image capturing lens assembly of the image capturing device according to the 1st embodiment, when the focal length of the first lens element 110 is f1, the focal length of the second lens element 120 is f2, and the focal length of the third lens element 130 is f3, the following condition is satisfied: |f1/f2|+|f1/f3|=0.37.

In the image capturing lens assembly of the image capturing device according to the 1st embodiment, when an axial distance between the image-side surface 162 of the sixth lens element 160 and an image plane 180 is BL, the focal length of the image capturing lens assembly is f, the following condition is satisfied: BL/f=0.58.

In the image capturing lens assembly of the image capturing device according to the 1st embodiment, when a maximal field of view of the image capturing lens assembly is FOV, the following condition is satisfied: FOV=140.0 deg.

The detailed optical data of the 1st embodiment are shown in Table 1 and the aspheric surface data are shown in Table 2 below.

TABLE 1

1st Embodiment
f = 2.00 mm, Fno = 2.35, HFOV = 70.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 21.315 | | 0.711 | Glass | 1.729 | 54.5 | −3.38 |
| 2 | | 2.177 | | 1.054 | | | | |
| 3 | Lens 2 | −7.184 | ASP | 0.883 | Plastic | 1.639 | 23.5 | 9.25 |
| 4 | | −3.397 | ASP | 0.979 | | | | |
| 5 | Lens 3 | −3.777 | ASP | 0.536 | Plastic | 1.544 | 55.9 | 628.92 |
| 6 | | −3.922 | ASP | −0.050 | | | | |
| 7 | Ape. Stop | Plano | | 0.100 | | | | |
| 8 | Lens 4 | 1.688 | ASP | 1.345 | Plastic | 1.544 | 55.9 | 1.65 |
| 9 | | −1.386 | ASP | 0.081 | | | | |
| 10 | Lens 5 | −1.210 | ASP | 0.500 | Plastic | 1.639 | 23.5 | −2.16 |
| 11 | | −11.192 | ASP | 0.983 | | | | |
| 12 | Lens 6 | 1.970 | ASP | 0.719 | Plastic | 1.535 | 55.7 | 9.60 |
| 13 | | 2.789 | ASP | 0.700 | | | | |
| 14 | IR-cut filter | Plano | | 0.210 | Glass | 1.517 | 64.2 | — |
| 15 | | Plano | | 0.251 | | | | |
| 16 | Image | Plano | | — | | | | |

Note:
Reference wavelength is 587.6 nm (d-line).

TABLE 2

Aspheric Coefficients

| Surface # | | | | | |
|---|---|---|---|---|---|
| | 3 | 4 | 5 | 6 | 8 |
| k = | 1.2465E+01 | −7.8328E+00 | −4.1808E+01 | −4.8973E+01 | −4.3646E+00 |
| A4 = | 1.9368E−02 | 2.2497E−02 | 6.1905E−02 | −1.2934E−01 | −3.2897E−02 |
| A6 = | −1.6045E−03 | −6.9057E−03 | −7.1909E−02 | 7.4991E−02 | 6.0571E−03 |
| A8 = | 1.4445E−03 | 6.3663E−03 | 4.0058E−02 | −6.0827E−02 | −2.9859E−02 |
| A10 = | −6.0475E−04 | −3.0587E−03 | −1.8784E−02 | 1.9164E−02 | −3.8829E−03 |
| A12 = | 6.3075E−05 | 5.6894E−04 | | | |

| Surface # | | | | | |
|---|---|---|---|---|---|
| | 9 | 10 | 11 | 12 | 13 |
| k = | −1.4911E−01 | −5.0976E+00 | −9.0000E+01 | −3.3114E+00 | −5.6256E−01 |
| A4 = | 2.0021E−01 | 6.3857E−03 | 8.4123E−02 | −2.1577E−02 | −9.0096E−03 |
| A6 = | −3.1452E−01 | −9.3978E−02 | −3.8074E−02 | −2.2588E−04 | −1.1438E−02 |
| A8 = | 2.7449E−01 | 1.2185E−01 | 6.4078E−02 | −5.9004E−03 | 6.6537E−04 |
| A10 = | −1.1784E−01 | −5.1583E−02 | −4.3431E−02 | 1.8695E−03 | 4.9476E−04 |
| A12 = | 1.9077E−02 | 5.8238E−03 | 1.3424E−02 | −1.5214E−04 | −1.0071E−04 |
| A14 = | | | −1.9061E−03 | | 5.4656E−06 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A4-A14 represent the aspheric coefficients ranging from the 4th order to the 14th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
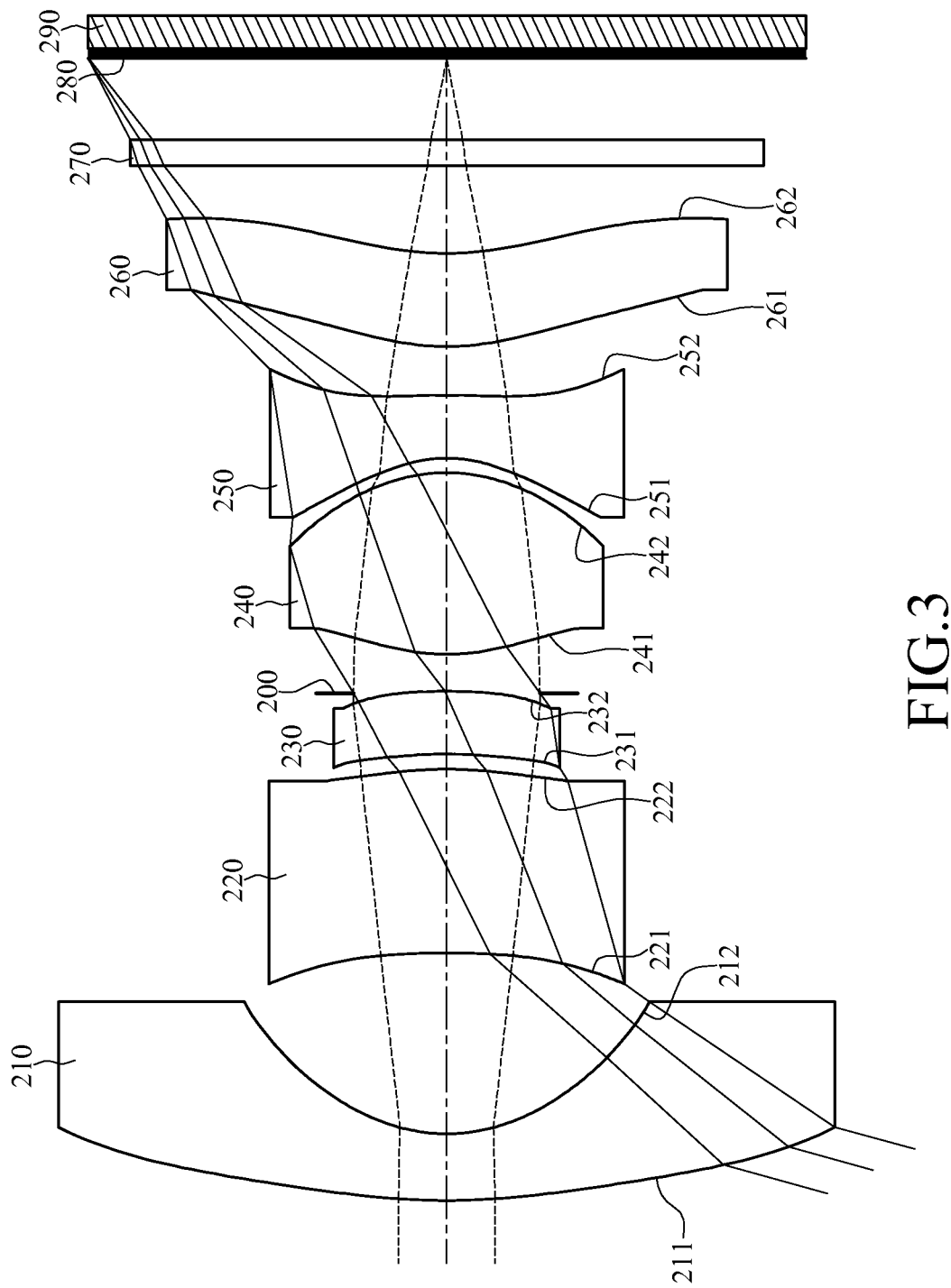
FIG. 3 is a schematic view of an image capturing device according to the 2nd embodiment of the present disclosure.
Figure 4:
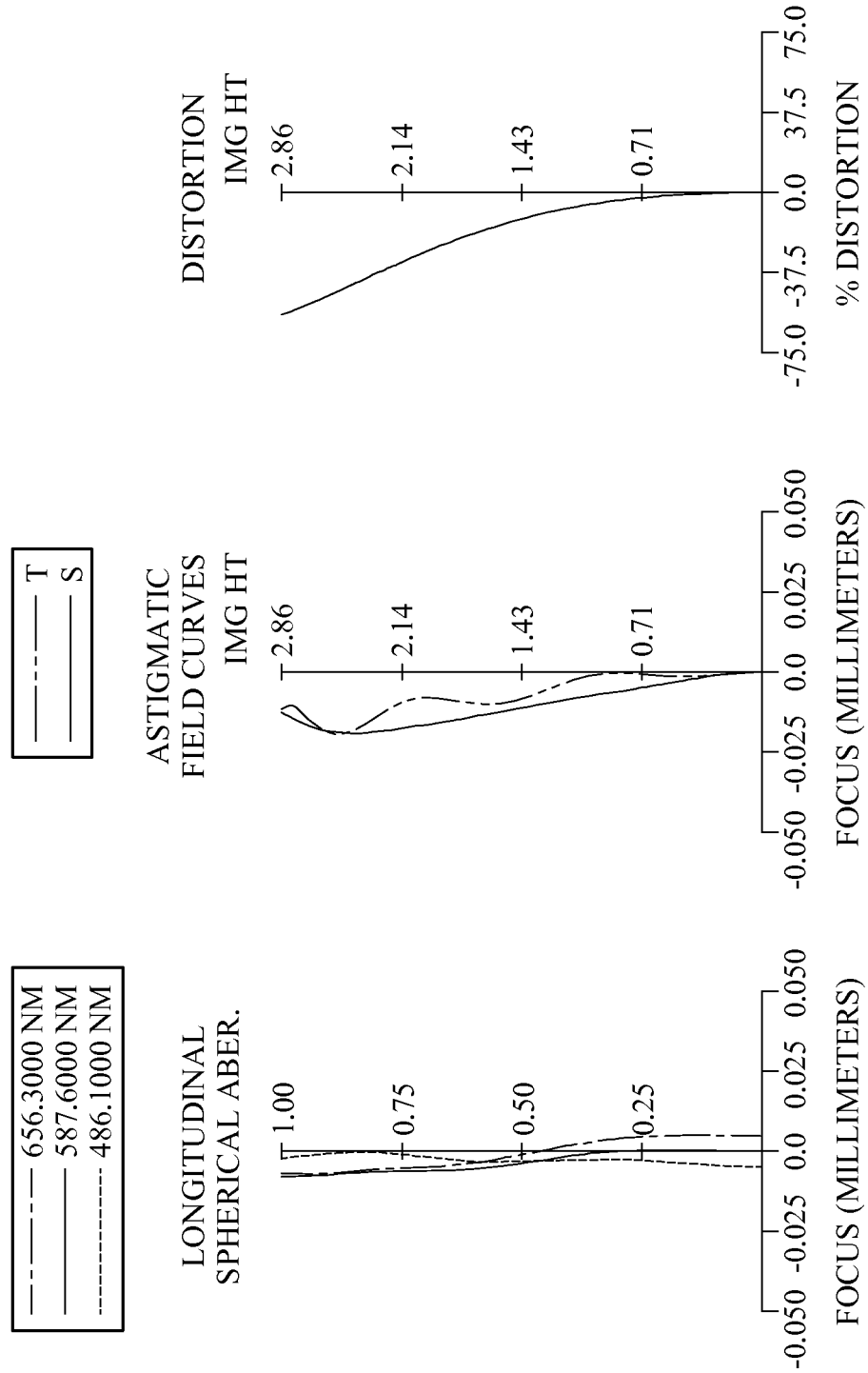
FIG. 4 shows spherical aberration curves, astigmatic field curves and a distortion curve of the image capturing device according to the 2nd embodiment.

FIG. 3 is a schematic view of an image capturing device according to the 2nd embodiment of the present disclosure. FIG. 4 shows, in order from left to right, spherical aberration curves, astigmatic field curves and a distortion curve of the image capturing device according to the 2nd embodiment. In FIG. 3, the image capturing device includes the image capturing lens assembly (not otherwise herein labeled) of the present disclosure and an image sensor 290. The image capturing lens assembly includes, in order from an object side to an image side, a first lens element 210, a second lens element 220, a third lens element 230, an aperture stop 200, a fourth lens element 240, a fifth lens element 250, a sixth lens element 260, an IR-cut filter 270 and an image plane 280, wherein the image capturing lens assembly has a total of six lens elements (210-260) with refractive power.

The first lens element 210 with negative refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric.

The second lens element 220 with positive refractive power has an object-side surface 221 being concave in a paraxial region thereof and an image-side surface 222 being convex in a paraxial region thereof. The second lens element 220 is made of plastic material and has the object-side surface 221 and the image-side surface 222 being both aspheric.

The third lens element 230 with negative refractive power has an object-side surface 231 being concave in a paraxial region thereof and an image-side surface 232 being convex in a paraxial region thereof. The third lens element 230 is made of plastic material and has the object-side surface 231 and the image-side surface 232 being both aspheric.

The fourth lens element 240 with positive refractive power has an object-side surface 241 being convex in a paraxial region thereof and an image-side surface 242 being convex in a paraxial region thereof. The fourth lens element 240 is made of plastic material and has the object-side surface 241 and the image-side surface 242 being both aspheric.

The fifth lens element 250 with negative refractive power has an object-side surface 251 being concave in a paraxial region thereof and an image-side surface 252 being convex in a paraxial region thereof, wherein the image-side surface 252 of the fifth lens element 250 has at least one inflection point in an off-axis region thereof. The fifth lens element 250 is made of plastic material and has the object-side surface 251 and the image-side surface 252 being both aspheric.

The sixth lens element 260 with positive refractive power has an object-side surface 261 being convex in a paraxial region thereof and an image-side surface 262 being concave in a paraxial region thereof, wherein the image-side surface 262 of the sixth lens element 260 has at least one inflection point in an off-axis region thereof. The sixth lens element 260 is made of plastic material and has the object-side surface 261 and the image-side surface 262 being both aspheric.

The IR-cut filter 270 is made of glass and located between the sixth lens element 260 and the image plane 280, and will not affect the focal length of the image capturing lens assembly. The image sensor 290 is disposed on or near the image plane 280 of the image capturing lens assembly.

The detailed optical data of the 2nd embodiment are shown in Table 3 and the aspheric surface data are shown in Table 4 below.

TABLE 3

2nd Embodiment
f = 2.00 mm, Fno = 2.60, HFOV = 74.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 5.555 | ASP | 0.531 | Plastic | 1.544 | 55.9 | −3.56 |
| 2 | | 1.389 | ASP | 1.442 | | | | |
| 3 | Lens 2 | −6.708 | ASP | 1.465 | Plastic | 1.583 | 30.2 | 7.49 |
| 4 | | −2.860 | ASP | 0.119 | | | | |
| 5 | Lens 3 | −3.594 | ASP | 0.500 | Plastic | 1.514 | 56.8 | −19.42 |
| 6 | | −5.885 | ASP | −0.016 | | | | |
| 7 | Ape. Stop | Plano | | 0.311 | | | | |
| 8 | Lens 4 | 1.617 | ASP | 1.448 | Plastic | 1.544 | 55.9 | 1.63 |
| 9 | | −1.344 | ASP | 0.117 | | | | |
| 10 | Lens 5 | −1.013 | ASP | 0.500 | Plastic | 1.633 | 23.4 | −1.88 |
| 11 | | −8.071 | ASP | 0.388 | | | | |
| 12 | Lens 6 | 1.863 | ASP | 0.742 | Plastic | 1.530 | 55.8 | 10.90 |
| 13 | | 2.370 | ASP | 0.700 | | | | |
| 14 | IR-cut filter | Plano | | 0.210 | Glass | 1.517 | 64.2 | — |
| 15 | | Plano | | 0.644 | | | | |
| 16 | Image | Plano | | — | | | | |

Note:
Reference wavelength is 587.6 nm (d-line).

TABLE 4

Aspheric Coefficients

| Surface # | 1 | 2 | 3 | 4 | 5 | 6 |
|---|---|---|---|---|---|---|
| k= | −7.7577E−01 | −8.6801E−01 | 1.6471E+01 | −1.9829E+01 | 9.7295E+00 | 3.1884E+01 |
| A4= | −1.3883E−02 | −1.6178E−03 | −2.4691E−02 | 4.0184E−02 | 1.6805E−01 | −2.0056E−01 |
| A6= | 2.0332E−03 | 2.5925E−03 | 7.2677E−04 | 2.0455E−02 | −1.3407E−01 | 1.8606E−01 |
| A8= | −1.3480E−04 | −1.6205E−03 | 4.6834E−03 | −6.9494E−02 | 3.7576E−04 | −2.0516E−01 |
| A10= | 4.1148E−06 | 9.0545E−04 | −2.1671E−03 | 4.3068E−02 | −1.0017E−02 | 9.9870E−02 |
| A12= | | | 6.5808E−04 | −1.0367E−02 | | |

| Surface # | 8 | 9 | 10 | 11 | 12 | 13 |
|---|---|---|---|---|---|---|
| k= | −6.2878E+00 | −4.1998E−01 | −3.1155E+00 | −8.7056E+01 | −6.6540E+00 | −6.7240E−01 |
| A4= | −9.5333E−03 | 8.8047E−02 | 6.0043E−02 | 1.1899E−01 | −2.8162E−02 | −7.1865E−02 |
| A6= | −5.0700E−03 | −1.2879E−01 | −1.3176E−01 | −1.5316E−02 | 1.0667E−02 | 1.5406E−02 |
| A8= | −1.6515E−02 | 1.3813E−01 | 1.3817E−01 | −7.8675E−03 | −2.4630E−03 | −2.7094E−03 |
| A10= | 4.2845E−03 | −7.1978E−02 | −7.1680E−02 | 2.0965E−03 | 3.3846E−04 | 2.7280E−04 |
| A12= | | 1.4560E−02 | 1.4989E−02 | 1.3767E−04 | −1.9380E−05 | −8.1268E−06 |
| A14= | | | | −5.0075E−05 | | −4.4909E−07 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 2.00 | f/R12 | 0.84 |
| Fno | 2.60 | |f2/f3| | 0.39 |
| HFOV [deg.] | 74.5 | |f1/f2| + |f1/f3| | 0.66 |
| (R11 − R12)/(R11 + R12) | −0.12 | BL/f | 0.78 |
| |f1/R3| | 0.53 | FOV [deg.] | 149.0 |

3rd Embodiment

Figure 5:
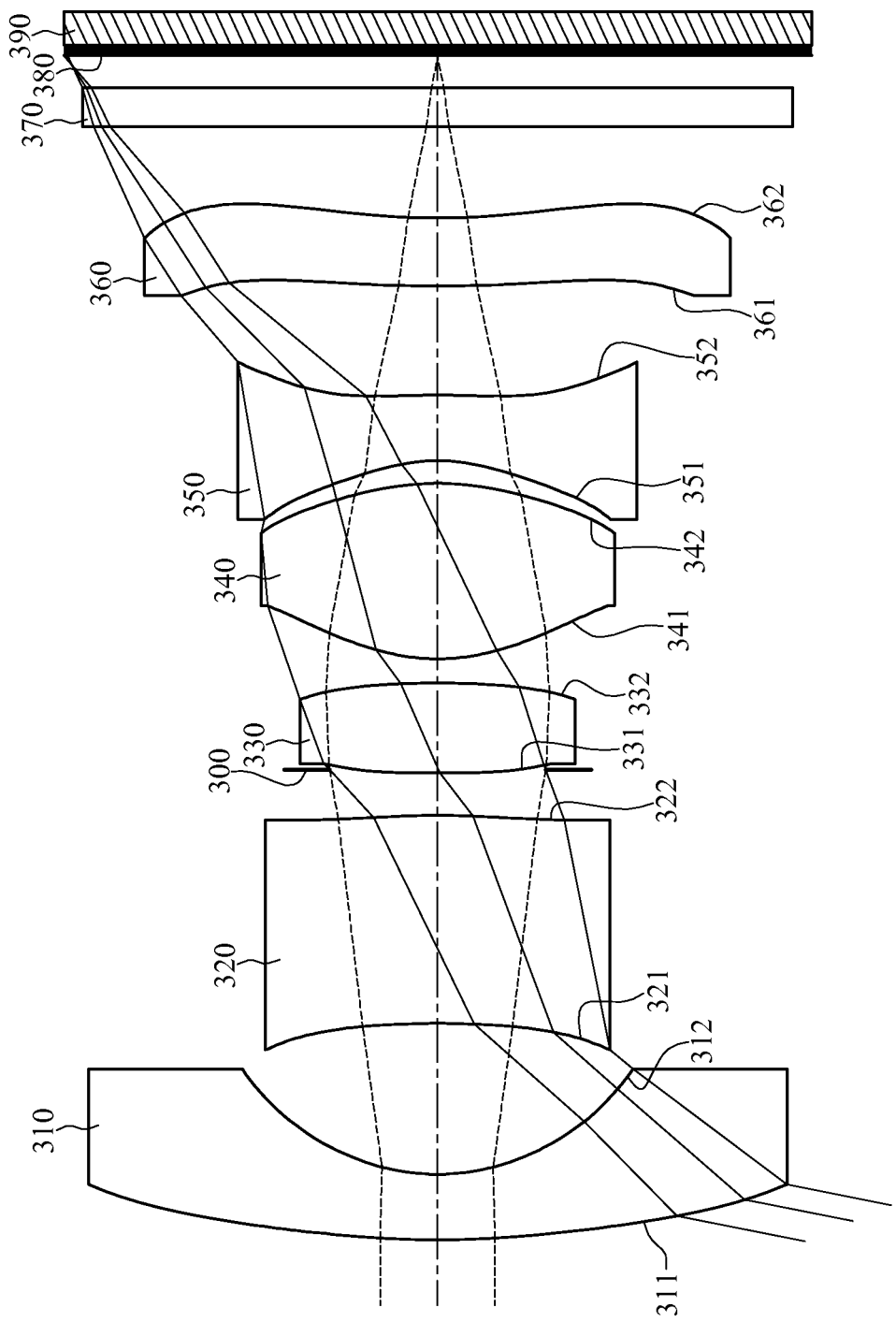
FIG. 5 is a schematic view of an image capturing device according to the 3rd embodiment of the present disclosure.
Figure 6:
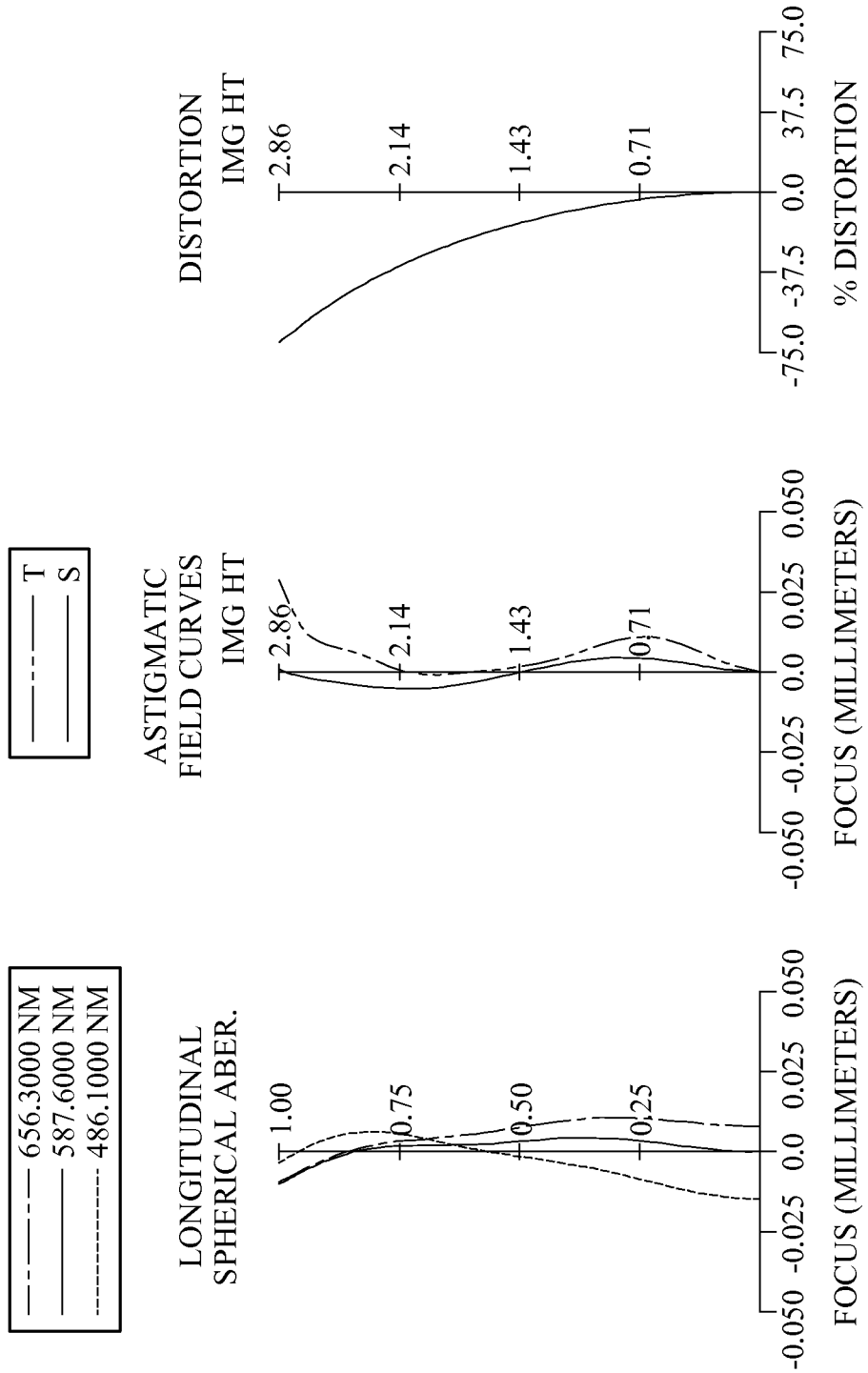
FIG. 6 shows spherical aberration curves, astigmatic field curves and a distortion curve of the image capturing device according to the 3rd embodiment.

FIG. 5 is a schematic view of an image capturing device according to the 3rd embodiment of the present disclosure. FIG. 6 shows, in order from left to right, spherical aberration curves, astigmatic field curves and a distortion curve of the image capturing device according to the 3rd embodiment. In FIG. 5, the image capturing device includes the image capturing lens assembly (not otherwise herein labeled) of the present disclosure and an image sensor 390. The image capturing lens assembly includes, in order from an object side to an image side, a first lens element 310, a second lens element 320, an aperture stop 300, a third lens element 330, a fourth lens element 340, a fifth lens element 350, a sixth lens element 360, an IR-cut filter 370 and an image plane 380, wherein the image capturing lens assembly has a total of six lens elements (310-360) with refractive power.

The first lens element 310 with negative refractive power has an object-side surface 311 being convex in a paraxial region thereof and an image-side surface 312 being concave in a paraxial region thereof. The first lens element 310 is made of glass material and has the object-side surface 311 and the image-side surface 312 being both aspheric.

The second lens element 320 with positive refractive power has an object-side surface 321 being concave in a paraxial region thereof and an image-side surface 322 being convex in a paraxial region thereof. The second lens element 320 is made of plastic material and has the object-side surface 321 and the image-side surface 322 being both aspheric.

The third lens element 330 with positive refractive power has an object-side surface 331 being convex in a paraxial region thereof and an image-side surface 332 being convex in a paraxial region thereof. The third lens element 330 is made of plastic material and has the object-side surface 331 and the image-side surface 332 being both aspheric.

The fourth lens element 340 with positive refractive power has an object-side surface 341 being convex in a paraxial region thereof and an image-side surface 342 being convex in a paraxial region thereof. The fourth lens element 340 is made of plastic material and has the object-side surface 341 and the image-side surface 342 being both aspheric.

The fifth lens element 350 with negative refractive power has an object-side surface 351 being concave in a paraxial region thereof and an image-side surface 352 being convex in a paraxial region thereof, wherein the image-side surface 352 of the fifth lens element 350 has at least one inflection point in an off-axis region thereof. The fifth lens element 350 is made of plastic material and has the object-side surface 351 and the image-side surface 352 being both aspheric.

The sixth lens element 360 with negative refractive power has an object-side surface 361 being convex in a paraxial region thereof and an image-side surface 362 being concave in a paraxial region thereof, wherein the image-side surface 362 of the sixth lens element 360 has at least one inflection point in an off-axis region thereof. The sixth lens element 360 is made of plastic material and has the object-side surface 361 and the image-side surface 362 being both aspheric.

The IR-cut filter 370 is made of glass and located between the sixth lens element 360 and the image plane 380, and will not affect the focal length of the image capturing lens assembly. The image sensor 390 is disposed on or near the image plane 380 of the image capturing lens assembly.

The detailed optical data of the 3rd embodiment are shown in Table 5 and the aspheric surface data are shown in Table 6 below.

TABLE 5

3rd Embodiment
f = 2.22 mm, Fno = 2.52, HFOV = 78.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 7.134 | ASP | 0.504 | Glass | 1.669 | 55.4 | −3.43 |
| 2 | | 1.687 | ASP | 1.158 | | | | |
| 3 | Lens 2 | −7.610 | ASP | 1.599 | Plastic | 1.650 | 21.5 | 25.19 |
| 4 | | −5.626 | ASP | 0.349 | | | | |
| 5 | Ape. Stop | Plano | | −0.022 | | | | |
| 6 | Lens 3 | 78.955 | ASP | 0.689 | Plastic | 1.514 | 56.8 | 14.47 |
| 7 | | −8.178 | ASP | 0.187 | | | | |
| 8 | Lens 4 | 1.514 | ASP | 1.348 | Plastic | 1.544 | 55.9 | 1.87 |
| 9 | | −2.125 | ASP | 0.175 | | | | |
| 10 | Lens 5 | −1.327 | ASP | 0.505 | Plastic | 1.650 | 21.5 | −2.77 |
| 11 | | −5.811 | ASP | 0.837 | | | | |
| 12 | Lens 6 | 11.596 | ASP | 0.522 | Plastic | 1.650 | 21.5 | −14.63 |
| 13 | | 5.134 | ASP | 0.700 | | | | |
| 14 | IR-cut filter | Plano | | 0.300 | Glass | 1.517 | 64.2 | — |
| 15 | | Plano | | 0.247 | | | | |
| 16 | Image | Plano | | — | | | | |

Note:
Reference wavelength is 587.6 nm (d-line).

TABLE 6

Aspheric Coefficients

| Surface # | 1 | 2 | 3 | 4 | 6 | 7 |
|---|---|---|---|---|---|---|
| k= | 3.6543E+00 | −5.9557E−01 | 2.4803E+01 | −1.6965E+01 | −9.0000E+01 | 4.9210E+01 |
| A4= | −1.1936E−02 | 2.0981E−03 | −6.6917E−03 | 8.5881E−02 | 2.0341E−01 | −4.7360E−02 |
| A6= | 2.1178E−03 | 3.8376E−03 | −1.1888E−02 | −4.8740E−02 | −1.6023E−01 | 5.8535E−02 |
| A8= | −1.8404E−04 | −1.2241E−03 | 6.1963E−03 | −1.0698E−02 | 7.4821E−02 | −5.1932E−02 |
| A10= | 5.8989E−06 | 9.8799E−04 | −4.3079E−03 | 2.3491E−02 | −2.5088E−02 | 1.6227E−02 |
| A12= | | | 1.7057E−03 | −7.6015E−03 | | |

| Surface # | 8 | 9 | 10 | 11 | 12 | 13 |
|---|---|---|---|---|---|---|
| k= | −5.2270E+00 | −3.6915E−01 | −4.7911E+00 | −8.4845E+01 | 9.2560E+00 | 3.4920E−01 |
| A4= | 5.1327E−02 | 7.8629E−02 | 6.6634E−02 | 1.8221E−01 | 5.0486E−03 | −2.3419E−02 |
| A6= | −3.1743E−02 | −9.5932E−02 | −1.3139E−01 | −1.1593E−01 | −1.3950E−02 | 2.1915E−03 |
| A8= | 1.3493E−02 | 1.1811E−01 | 1.3973E−01 | 6.6352E−02 | 3.8247E−03 | −1.6598E−03 |
| A10= | −5.0155E−03 | −7.1368E−02 | −7.8422E−02 | −2.8394E−02 | −6.4976E−04 | 4.6061E−04 |
| A12= | | 1.4560E−02 | 1.5472E−02 | 6.6218E−03 | 5.5001E−05 | −6.3143E−05 |
| A14= | | | | −6.1429E−04 | | 2.9860E−06 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 2.22 | f/R12 | 0.43 |
| Fno | 2.52 | \|f2/f3\| | 1.74 |
| HFOV [deg.] | 78.7 | \|f1/f2\| + \|f1/f3\| | 0.37 |
| (R11 − R12)/(R11 + R12) | 0.39 | BL/f | 0.56 |
| \|f1/R3\| | 0.45 | FOV [deg.] | 157.4 |

4th Embodiment

Figure 7:
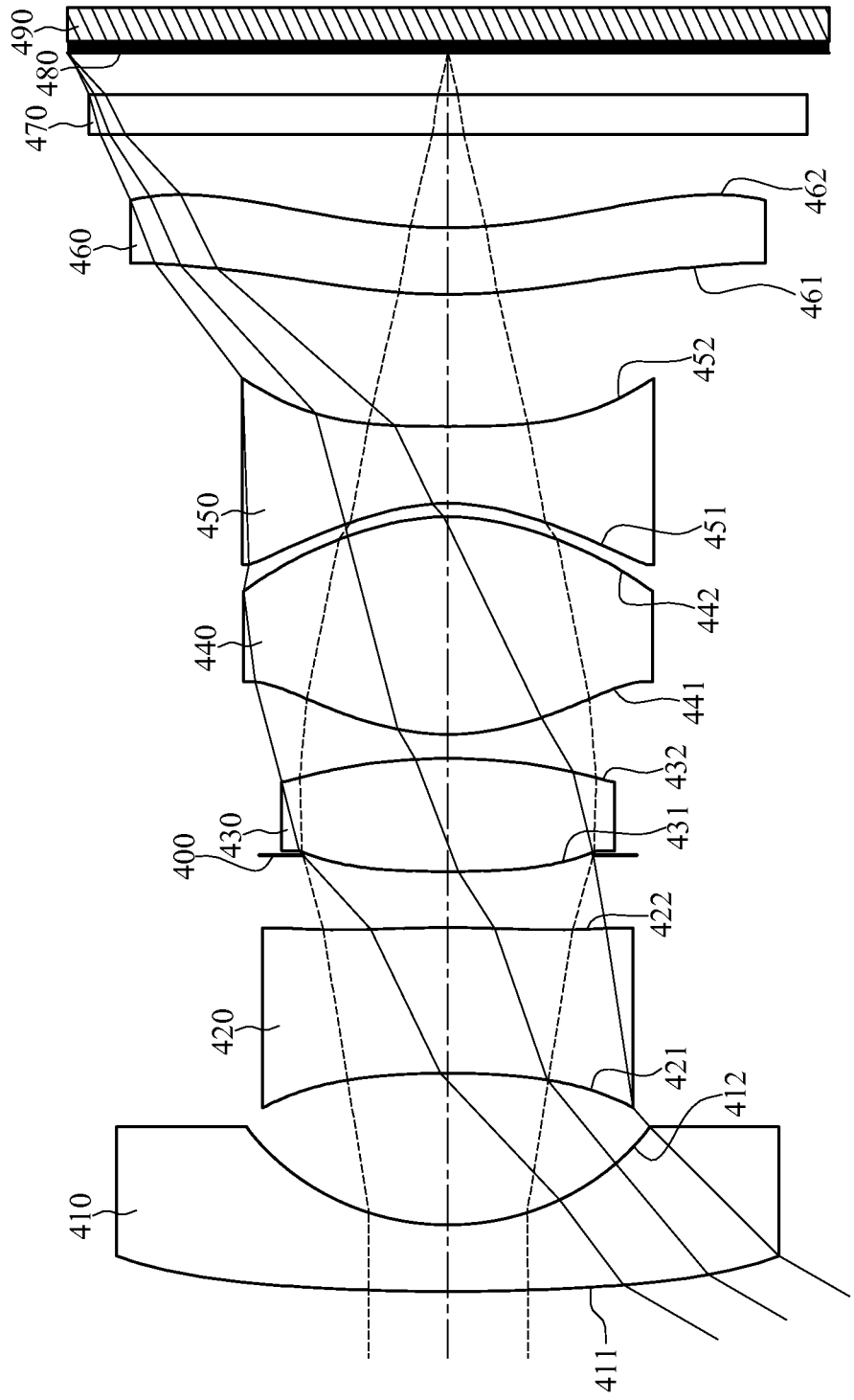
FIG. 7 is a schematic view of an image capturing device according to the 4th embodiment of the present disclosure.
Figure 8:
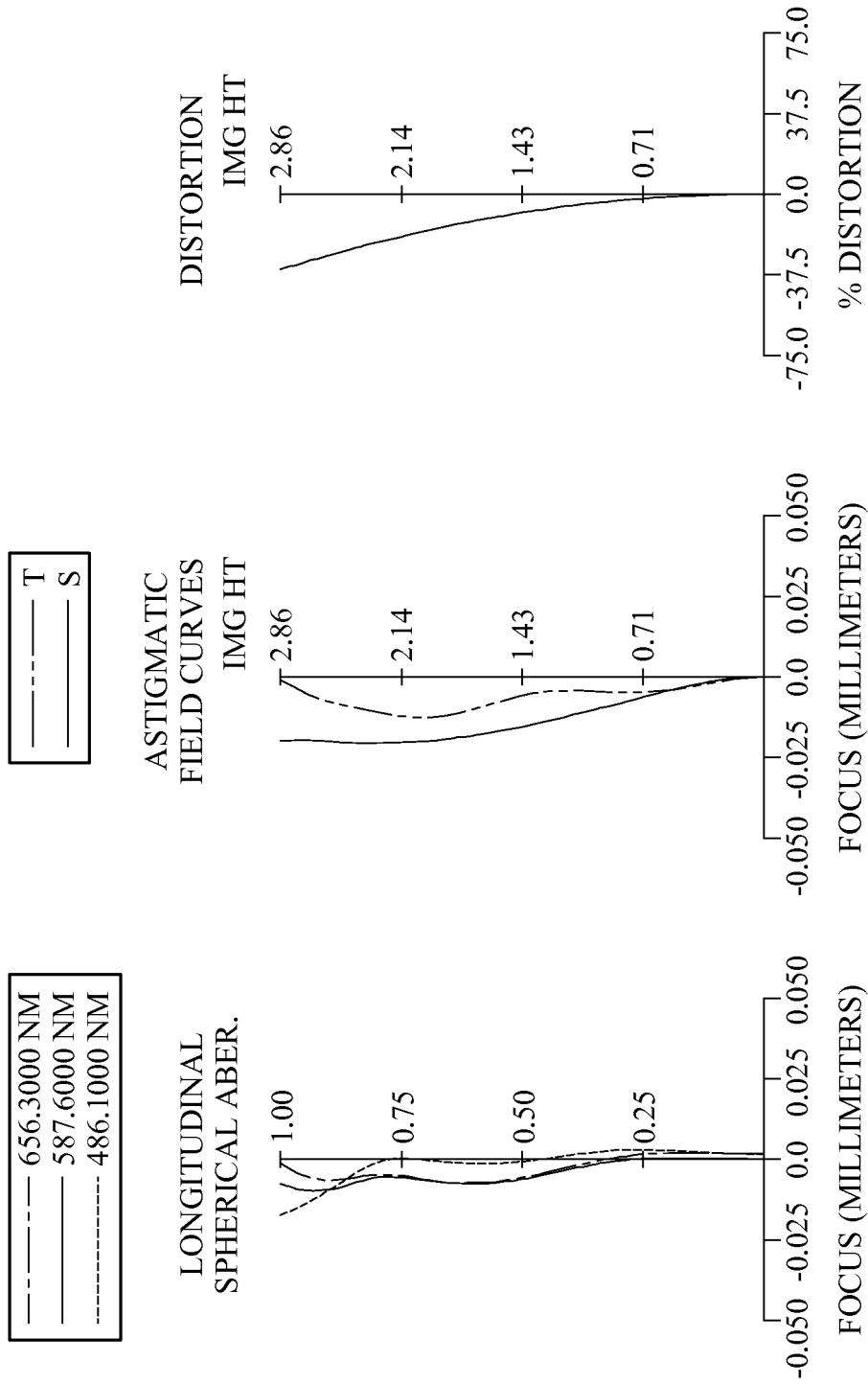
FIG. 8 shows spherical aberration curves, astigmatic field curves and a distortion curve of the image capturing device according to the 4th embodiment.

FIG. 7 is a schematic view of an image capturing device according to the 4th embodiment of the present disclosure. FIG. 8 shows, in order from left to right, spherical aberration curves, astigmatic field curves and a distortion curve of the image capturing device according to the 4th embodiment. In FIG. 7, the image capturing device includes the image capturing lens assembly (not otherwise herein labeled) of the present disclosure and an image sensor 490. The image capturing lens assembly includes, in order from an object side to an image side, a first lens element 410, a second lens element 420, an aperture stop 400, a third lens element 430, a fourth lens element 440, a fifth lens element 450, a sixth lens element 460, an IR-cut filter 470 and an image plane 480, wherein the image capturing lens assembly has a total of six lens elements (410-460) with refractive power.

The first lens element 410 with negative refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric.

The second lens element 420 with negative refractive power has an object-side surface 421 being concave in a paraxial region thereof and an image-side surface 422 being convex in a paraxial region thereof. The second lens element 420 is made of plastic material and has the object-side surface 421 and the image-side surface 422 being both aspheric.

The third lens element 430 with positive refractive power has an object-side surface 431 being convex in a paraxial region thereof and an image-side surface 432 being convex in a paraxial region thereof. The third lens element 430 is made of plastic material and has the object-side surface 431 and the image-side surface 432 being both aspheric.

The fourth lens element 440 with positive refractive power has an object-side surface 441 being convex in a paraxial region thereof and an image-side surface 442 being convex in a paraxial region thereof. The fourth lens element 440 is made of plastic material and has the object-side surface 441 and the image-side surface 442 being both aspheric.

The fifth lens element 450 with negative refractive power has an object-side surface 451 being concave in a paraxial region thereof and an image-side surface 452 being concave in a paraxial region thereof. The fifth lens element 450 is made of plastic material and has the object-side surface 451 and the image-side surface 452 being both aspheric.

The sixth lens element 460 with negative refractive power has an object-side surface 461 being convex in a paraxial region thereof and an image-side surface 462 being concave in a paraxial region thereof, wherein the image-side surface 462 of the sixth lens element 460 has at least one inflection point in an off-axis region thereof. The sixth lens element 460 is made of plastic material and has the object-side surface 461 and the image-side surface 462 being both aspheric.

The IR-cut filter 470 is made of glass and located between the sixth lens element 460 and the image plane 480, and will not affect the focal length of the image capturing lens assembly. The image sensor 490 is disposed on or near the image plane 480 of the image capturing lens assembly.

The detailed optical data of the 4th embodiment are shown in Table 7 and the aspheric surface data are shown in Table 8 below.

TABLE 7

4th Embodiment
f = 2.62 mm, Fno = 2.18, HFOV = 60.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 16.926 | ASP | 0.500 | Plastic | 1.544 | 55.9 | −4.09 |
| 2 | | 1.947 | ASP | 1.140 | | | | |
| 3 | Lens 2 | −6.517 | ASP | 1.093 | Plastic | 1.583 | 30.2 | −52.38 |
| 4 | | −8.796 | ASP | 0.543 | | | | |
| 5 | Ape. Stop | Plano | | −0.121 | | | | |
| 6 | Lens 3 | 16.020 | ASP | 0.847 | Plastic | 1.514 | 56.8 | 7.35 |
| 7 | | −4.852 | ASP | 0.181 | | | | |
| 8 | Lens 4 | 1.804 | ASP | 1.633 | Plastic | 1.535 | 55.7 | 2.00 |
| 9 | | −1.794 | ASP | 0.100 | | | | |
| 10 | Lens 5 | −1.660 | ASP | 0.577 | Plastic | 1.639 | 23.5 | −2.26 |
| 11 | | 12.719 | ASP | 0.994 | | | | |
| 12 | Lens 6 | 4.729 | ASP | 0.500 | Plastic | 1.535 | 55.7 | −78.16 |
| 13 | | 4.092 | ASP | 0.700 | | | | |
| 14 | IR-cut filter | Plano | | 0.300 | Glass | 1.517 | 64.2 | — |
| 15 | | Plano | | 0.314 | | | | |
| 16 | Image | Plano | | — | | | | |

Note:
Reference wavelength is 587.6 nm (d-line).

TABLE 8

Aspheric Coefficients

| Surface # | 1 | 2 | 3 | 4 | 6 | 7 |
|---|---|---|---|---|---|---|
| k= | 3.1781E+01 | −5.5346E−01 | 1.5086E+01 | 3.5181E+01 | −1.3375E+01 | −8.5290E+00 |
| A4= | −2.6871E−03 | 5.6973E−03 | −1.5772E−02 | 6.5484E−02 | 1.1936E−01 | −3.4830E−02 |
| A6= | 9.0291E−04 | 5.9238E−03 | −5.3223E−03 | −1.9592E−02 | −5.6605E−02 | 2.5030E−02 |
| A8= | −6.8419E−05 | −2.3180E−03 | −1.0750E−04 | 1.5949E−04 | 1.8850E−02 | −1.5544E−02 |
| A10= | 2.4278E−06 | 1.0503E−03 | 1.2261E−03 | 5.0469E−03 | −2.1113E−03 | 5.0606E−03 |
| A12= | | | 2.2388E−05 | −6.6122E−04 | | |

| Surface # | 8 | 9 | 10 | 11 | 12 | 13 |
|---|---|---|---|---|---|---|
| k= | −5.2701E+00 | −1.0016E+00 | −2.9048E+00 | 5.2777E+01 | −3.0592E+00 | −3.2861E−01 |
| A4= | 3.8909E−02 | 3.9892E−02 | 2.1157E−02 | 6.6896E−02 | −9.0033E−03 | −1.0548E−02 |
| A6= | −2.0929E−02 | 1.8879E−03 | 6.0705E−03 | −1.1638E−02 | −2.9750E−03 | −4.7423E−03 |

TABLE 8-continued

| Aspheric Coefficients | | | | | | |
|---|---|---|---|---|---|---|
| A8= | 5.6810E−03 | −1.4842E−02 | −2.0013E−02 | 1.7110E−03 | 9.8032E−04 | 1.5248E−03 |
| A10= | −2.1688E−03 | 5.8922E−03 | 1.0509E−02 | −5.1379E−04 | −1.0397E−04 | −2.5153E−04 |
| A12= | | −7.1252E−04 | −1.6234E−03 | −2.8731E−05 | 4.2592E−06 | 2.2032E−05 |
| A14= | | | | 5.8597E−06 | | −8.6733E−07 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 2.62 | f/R12 | 0.64 |
| Fno | 2.18 | |f2/f3| | 7.12 |
| HFOV [deg.] | 60.0 | |f1/f2| + |f1/f3| | 0.63 |
| (R11 − R12)/(R11 + R12) | 0.07 | BL/f | 0.50 |
| |f1/R3| | 0.63 | FOV [deg.] | 120.0 |

5th Embodiment

Figure 9:
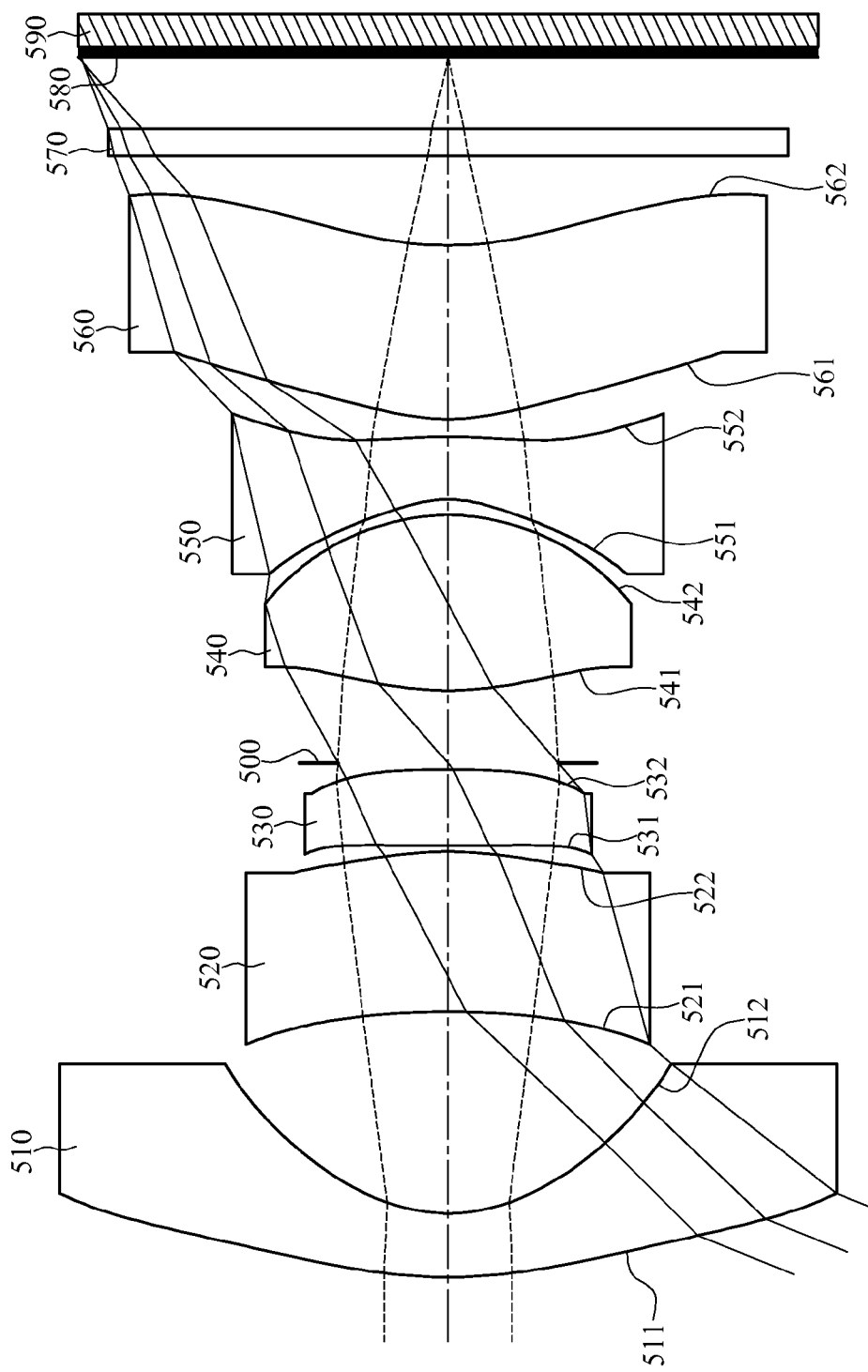
FIG. 9 is a schematic view of an image capturing device according to the 5th embodiment of the present disclosure.
Figure 10:
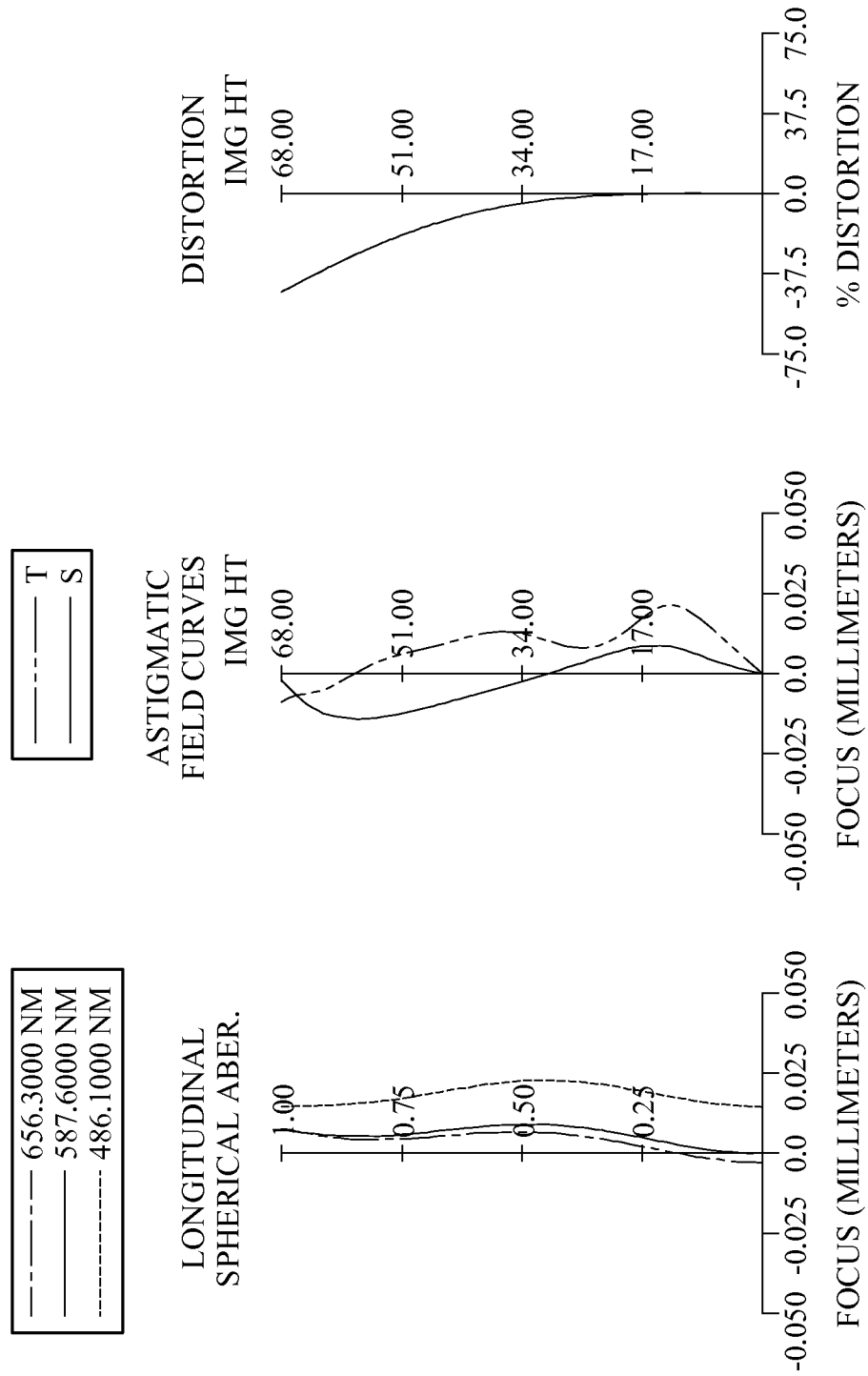
FIG. 10 shows spherical aberration curves, astigmatic field curves and a distortion curve of the image capturing device according to the 5th embodiment.

FIG. 9 is a schematic view of an image capturing device according to the 5th embodiment of the present disclosure. FIG. 10 shows, in order from left to right, spherical aberration curves, astigmatic field curves and a distortion curve of the image capturing device according to the 5th embodiment. In FIG. 9, the image capturing device includes the image capturing lens assembly (not otherwise herein labeled) of the present disclosure and an image sensor 590. The image capturing lens assembly includes, in order from an object side to an image side, a first lens element 510, a second lens element 520, a third lens element 530, an aperture stop 500, a fourth lens element 540, a fifth lens element 550, a sixth lens element 560, an IR-cut filter 570 and an image plane 580, wherein the image capturing lens assembly has a total of six lens elements (510-560) with refractive power.

The first lens element 510 with negative refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric.

The second lens element 520 with positive refractive power has an object-side surface 521 being concave in a paraxial region thereof and an image-side surface 522 being convex in a paraxial region thereof. The second lens element 520 is made of plastic material and has the object-side surface 521 and the image-side surface 522 being both aspheric.

The third lens element 530 with positive refractive power has an object-side surface 531 being convex in a paraxial region thereof and an image-side surface 532 being convex in a paraxial region thereof. The third lens element 530 is made of plastic material and has the object-side surface 531 and the image-side surface 532 being both aspheric.

The fourth lens element 540 with positive refractive power has an object-side surface 541 being convex in a paraxial region thereof and an image-side surface 542 being convex in a paraxial region thereof. The fourth lens element 540 is made of plastic material and has the object-side surface 541 and the image-side surface 542 being both aspheric.

The fifth lens element 550 with negative refractive power has an object-side surface 551 being concave in a paraxial region thereof and an image-side surface 552 being convex in a paraxial region thereof, wherein the image-side surface 552 of the fifth lens element 550 has at least one inflection point in an off-axis region thereof. The fifth lens element 550 is made of plastic material and has the object-side surface 551 and the image-side surface 552 being both aspheric.

The sixth lens element 560 with positive refractive power has an object-side surface 561 being convex in a paraxial region thereof and an image-side surface 562 being concave in a paraxial region thereof, wherein the image-side surface 562 of the sixth lens element 560 has at least one inflection point in an off-axis region thereof. The sixth lens element 560 is made of plastic material and has the object-side surface 561 and the image-side surface 562 being both aspheric.

The IR-cut filter 570 is made of glass and located between the sixth lens element 560 and the image plane 580, and will not affect the focal length of the image capturing lens assembly. The image sensor 590 is disposed on or near the image plane 580 of the image capturing lens assembly.

The detailed optical data of the 5th embodiment are shown in Table 9 and the aspheric surface data are shown in Table 10 below.

TABLE 9

5th Embodiment
f = 2.25 mm, Fno = 2.25, HFOV = 68.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.800 | ASP | 0.499 | Plastic | 1.544 | 55.9 | −4.12 |
| 2 | | 1.345 | ASP | 1.575 | | | | |
| 3 | Lens 2 | −6.848 | ASP | 1.249 | Plastic | 1.544 | 55.9 | 8.06 |
| 4 | | −2.846 | ASP | 0.050 | | | | |
| 5 | Lens 3 | 99.952 | ASP | 0.593 | Plastic | 1.544 | 55.9 | 21.62 |

TABLE 9-continued

5th Embodiment
f = 2.25 mm, Fno = 2.25, HFOV = 68.0 deg.

| Surface # | | Curvature Radius | | Thickness | Material | Index | Abbe # | Focal Length |
|---|---|---|---|---|---|---|---|---|
| 6 | | −13.306 | ASP | 0.050 | | | | |
| 7 | Ape. Stop | Plano | | 0.569 | | | | |
| 8 | Lens 4 | 2.459 | ASP | 1.369 | Plastic | 1.544 | 55.9 | 1.99 |
| 9 | | −1.553 | ASP | 0.123 | | | | |
| 10 | Lens 5 | −0.909 | ASP | 0.490 | Plastic | 1.639 | 23.5 | −1.97 |
| 11 | | −3.949 | ASP | 0.138 | | | | |
| 12 | Lens 6 | 1.641 | ASP | 1.356 | Plastic | 1.544 | 55.9 | 5.67 |
| 13 | | 2.486 | ASP | 0.700 | | | | |
| 14 | IR-cut filter | Plano | | 0.210 | Glass | 1.517 | 64.2 | — |
| 15 | | Plano | | 0.558 | | | | |
| 16 | Image | Plano | | — | | | | |

Note:
Reference wavelength is 587.6 nm (d-line).

TABLE 10

Aspheric Coefficients

| Surface # | 1 | 2 | 3 | 4 | 5 | 6 |
|---|---|---|---|---|---|---|
| k= | −2.4314E+00 | −1.1183E+00 | 1.4804E+01 | −8.1278E+00 | 8.9746E+01 | −8.2504E+00 |
| A4= | −1.4807E−02 | 1.4511E−03 | −1.0604E−02 | 4.0736E−02 | −2.0017E−03 | −1.4892E−01 |
| A6= | 1.7599E−03 | 1.7060E−04 | 3.5120E−03 | 4.3116E−03 | 1.5663E−02 | 7.4536E−02 |
| A8= | −9.2466E−05 | −3.0768E−04 | 5.3774E−03 | −1.4515E−02 | −5.6815E−02 | −5.2614E−02 |
| A10= | 2.8155E−06 | 3.9328E−04 | −4.5017E−03 | −5.3073E−03 | 1.1118E−02 | 1.2909E−02 |
| A12= | | | 9.9542E−04 | 4.5075E−03 | | |

| Surface # | 8 | 9 | 10 | 11 | 12 | 13 |
|---|---|---|---|---|---|---|
| k= | −2.2294E+00 | −1.0900E−01 | −4.2979E+00 | −6.6229E+01 | −9.0267E+00 | −7.9390E−01 |
| A4= | −5.6894E−02 | 1.5754E−01 | 1.1384E−01 | 6.1422E−02 | −2.2492E−02 | −4.4313E−02 |
| A6= | 1.4329E−02 | −1.9914E−01 | −1.5171E−01 | 4.7859E−02 | 1.0902E−02 | 6.1163E−03 |
| A8= | −4.1339E−03 | 1.3779E−01 | 7.9451E−02 | −5.7413E−02 | −2.4831E−03 | −6.3199E−04 |
| A10= | −8.7771E−04 | −4.6576E−02 | −2.4850E−02 | 2.3395E−02 | 2.9720E−04 | 3.0339E−05 |
| A12= | | 6.6309E−03 | 3.6514E−03 | −4.4683E−03 | −1.4676E−05 | −5.4258E−07 |
| A14= | | | | 3.3824E−04 | | |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 2.25 | f/R12 | 0.91 |
| Fno | 2.25 | |f2/f3| | 0.37 |
| HFOV [deg.] | 68.0 | |f1/f2| + |f1/f3| | 0.70 |
| (R11 − R12)/(R11 + R12) | −0.20 | BL/f | 0.65 |
| |f1/R3| | 0.60 | FOV [deg.] | 136.0 |

6th Embodiment

Figure 11:
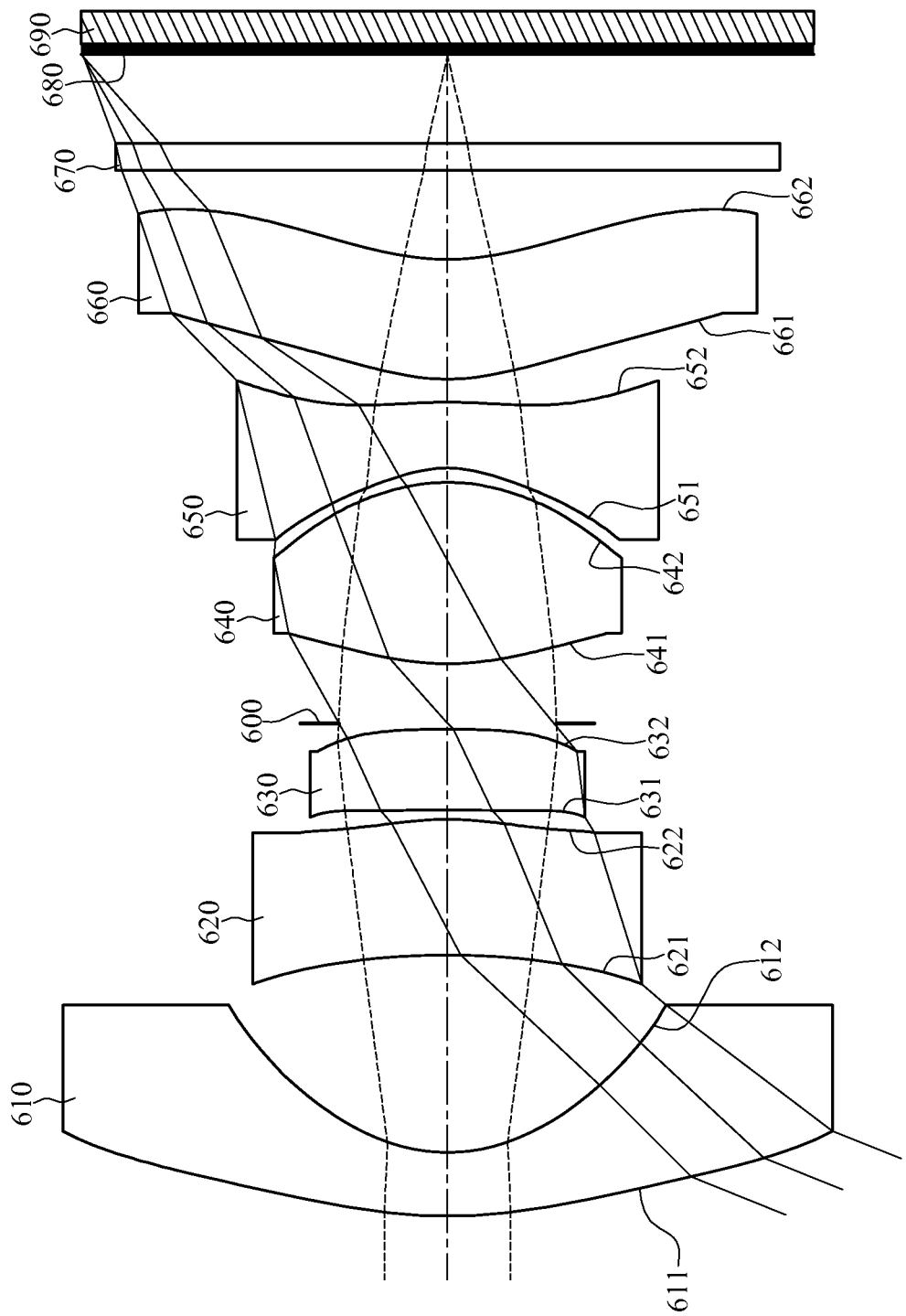
FIG. 11 is a schematic view of an image capturing device according to the 6th embodiment of the present disclosure.
Figure 12:
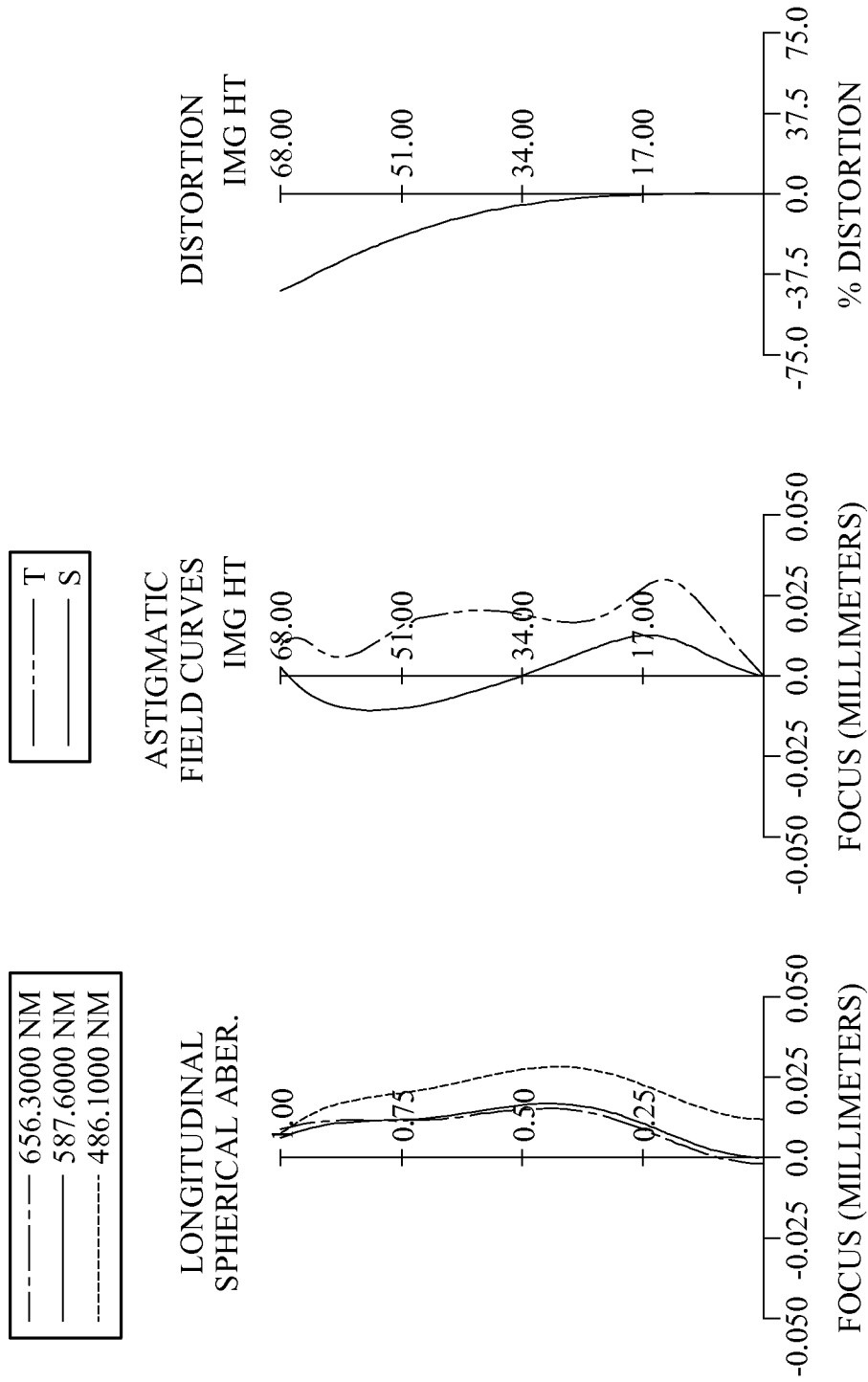
FIG. 12 shows spherical aberration curves, astigmatic field curves and a distortion curve of the image capturing device according to the 6th embodiment.

FIG. 11 is a schematic view of an image capturing device according to the 6th embodiment of the present disclosure. FIG. 12 shows, in order from left to right, spherical aberration curves, astigmatic field curves and a distortion curve of the image capturing device according to the 6th embodiment. In FIG. 11, the image capturing device includes the image capturing lens assembly (not otherwise herein labeled) of the present disclosure and an image sensor 690. The image capturing lens assembly includes, in order from an object side to an image side, a first lens element 610, a second lens element 620, a third lens element 630, an aperture stop 600, a fourth lens element 640, a fifth lens element 650, a sixth lens element 660, an IR-cut filter 670 and an image plane 680, wherein the image capturing lens assembly has a total of six lens elements (610-660) with refractive power.

The first lens element 610 with negative refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric.

The second lens element 620 with positive refractive power has an object-side surface 621 being concave in a paraxial region thereof and an image-side surface 622 being convex in a paraxial region thereof. The second lens element 620 is made of plastic material and has the object-side surface 621 and the image-side surface 622 being both aspheric.

The third lens element 630 with positive refractive power has an object-side surface 631 being concave in a paraxial region thereof and an image-side surface 632 being convex in a paraxial region thereof. The third lens element 630 is made of plastic material and has the object-side surface 631 and the image-side surface 632 being both aspheric.

The fourth lens element 640 with positive refractive power has an object-side surface 641 being convex in a paraxial region thereof and an image-side surface 642 being convex in a paraxial region thereof. The fourth lens element 640 is made of plastic material and has the object-side surface 641 and the image-side surface 642 being both aspheric.

The fifth lens element 650 with negative refractive power has an object-side surface 651 being concave in a paraxial region thereof and an image-side surface 652 being convex in a paraxial region thereof, wherein the image-side surface 652 of the fifth lens element 650 has at least one inflection point in an off-axis region thereof. The fifth lens element 650 is made of plastic material and has the object-side surface 651 and the image-side surface 652 being both aspheric.

The sixth lens element 660 with positive refractive power has an object-side surface 661 being convex in a paraxial region thereof and an image-side surface 662 being concave in a paraxial region thereof, wherein the image-side surface 662 of the sixth lens element 660 has at least one inflection point in an off-axis region thereof. The sixth lens element 660 is made of plastic material and has the object-side surface 661 and the image-side surface 662 being both aspheric.

The IR-cut filter 670 is made of glass and located between the sixth lens element 660 and the image plane 680, and will not affect the focal length of the image capturing lens assembly. The image sensor 690 is disposed on or near the image plane 680 of the image capturing lens assembly.

The detailed optical data of the 6th embodiment are shown in Table 11 and the aspheric surface data are shown in Table 12 below.

TABLE 11

6th Embodiment
f = 2.23 mm, Fno = 2.25, HFOV = 68.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.964 | ASP | 0.500 | Plastic | 1.544 | 55.9 | −4.03 |
| 2 | | 1.349 | ASP | 1.552 | | | | |
| 3 | Lens 2 | −6.510 | ASP | 1.066 | Plastic | 1.544 | 55.9 | 7.55 |
| 4 | | −2.665 | ASP | 0.073 | | | | |
| 5 | Lens 3 | −23.087 | ASP | 0.636 | Plastic | 1.544 | 55.9 | 74.49 |
| 6 | | −14.852 | ASP | 0.050 | | | | |
| 7 | Ape. Stop | Plano | | 0.465 | | | | |
| 8 | Lens 4 | 2.128 | ASP | 1.427 | Plastic | 1.544 | 55.9 | 1.80 |
| 9 | | −1.382 | ASP | 0.112 | | | | |
| 10 | Lens 5 | −0.938 | ASP | 0.517 | Plastic | 1.639 | 23.5 | −2.03 |
| 11 | | −4.114 | ASP | 0.182 | | | | |
| 12 | Lens 6 | 1.679 | ASP | 0.942 | Plastic | 1.544 | 55.9 | 9.04 |
| 13 | | 2.045 | ASP | 0.700 | | | | |
| 14 | IR-cut filter | Plano | | 0.210 | Glass | 1.517 | 64.2 | — |
| 15 | | Plano | | 0.701 | | | | |
| 16 | Image | Plano | | — | | | | |

Note:
Reference wavelength is 587.6 nm (d-line).

TABLE 12

| Aspheric Coefficients | | | | | | |
|---|---|---|---|---|---|---|
| Surface # | 1 | 2 | 3 | 4 | 5 | 6 |
| k= | −2.4122E+00 | −1.0225E+00 | 1.3646E+01 | −1.9346E+01 | 9.0000E+01 | 3.5043E+00 |
| A4= | −1.4391E−02 | −4.2764E−04 | −1.2139E−02 | 2.4650E−02 | 5.8564E−02 | −1.7485E−01 |
| A6= | 1.8315E−03 | −1.0859E−04 | 1.2893E−02 | 4.3529E−02 | −5.5538E−02 | 9.4379E−02 |
| A8= | −1.0190E−04 | 1.3977E−04 | −1.6490E−04 | −2.2641E−02 | 2.0821E−02 | −6.1852E−02 |
| A10= | 3.1981E−06 | 3.1764E−04 | −3.2449E−03 | −8.2732E−03 | −2.8051E−02 | 1.2957E−02 |
| A12= | | | 9.4406E−04 | 3.2519E−03 | | |

| Surface # | 8 | 9 | 10 | 11 | 12 | 13 |
|---|---|---|---|---|---|---|
| k= | −4.0863E+00 | −3.4664E−01 | −4.3222E+00 | −9.0000E+01 | −6.3261E+00 | −9.2125E−01 |
| A4= | −4.5156E−02 | 2.2507E−01 | 1.3411E−01 | 8.3562E−02 | −3.0249E−02 | −6.8034E−02 |
| A6= | 2.4513E−02 | −3.2405E−01 | −2.7412E−01 | −1.0229E−02 | 1.0609E−02 | 1.3298E−02 |
| A8= | −1.6226E−02 | 2.7268E−01 | 2.2601E−01 | −7.3332E−03 | −2.0104E−03 | −1.9930E−03 |
| A10= | 5.4363E−03 | −1.1237E−01 | −9.4576E−02 | 2.6046E−03 | 2.3100E−04 | 1.4142E−04 |
| A12= | | 1.9077E−02 | 1.5551E−02 | −2.2014E−04 | −1.2958E−05 | 2.1779E−06 |
| A14= | | | | −5.5074E−06 | | −7.2184E−07 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 2.23 | f/R12 | 1.09 |
| Fno | 2.25 | |f2/f3| | 0.10 |
| HFOV [deg.] | 68.0 | |f1/f2| + |f1/f3| | 0.59 |
| (R11 − R12)/(R11 + R12) | −0.10 | BL/f | 0.72 |
| |f1/R3| | 0.62 | FOV [deg.] | 136.0 |

7th Embodiment

Figure 13:
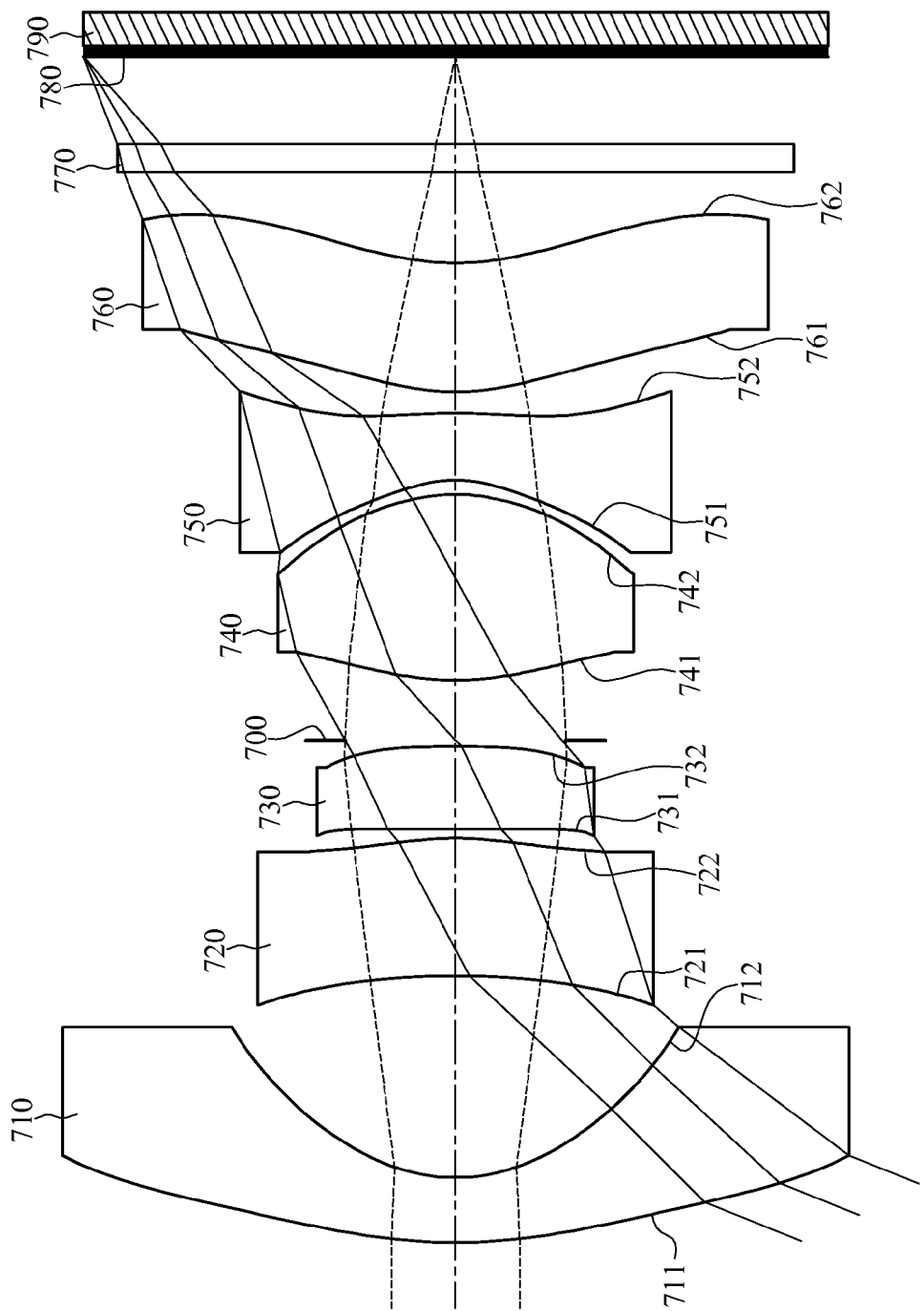
FIG. 13 is a schematic view of an image capturing device according to the 7th embodiment of the present disclosure.
Figure 14:
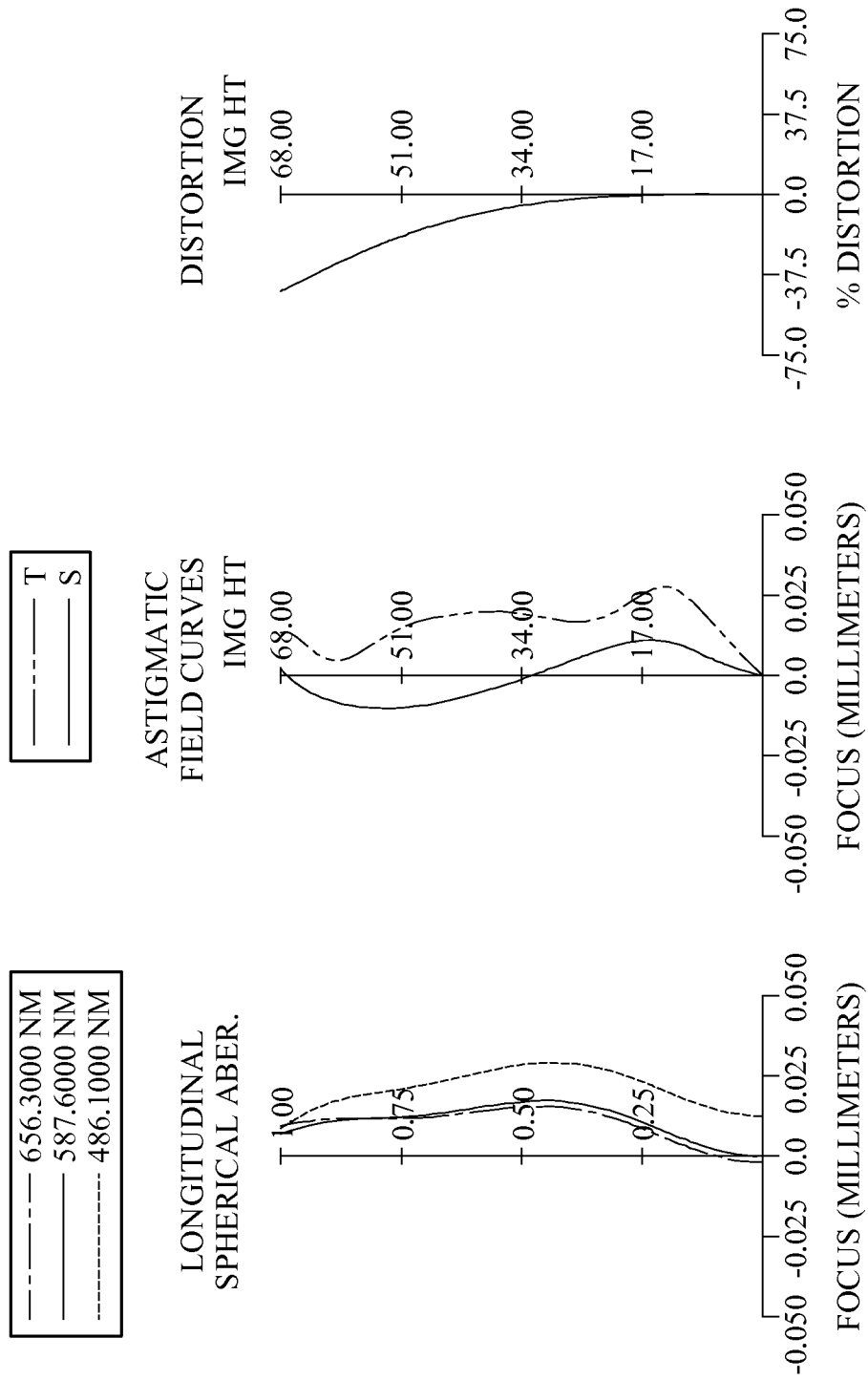
FIG. 14 shows spherical aberration curves, astigmatic field curves and a distortion curve of the image capturing device according to the 7th embodiment.

FIG. 13 is a schematic view of an image capturing device according to the 7th embodiment of the present disclosure. FIG. 14 shows, in order from left to right, spherical aberration curves, astigmatic field curves and a distortion curve of the image capturing device according to the 7th embodiment. In FIG. 13, the image capturing device includes the image capturing lens assembly (not otherwise herein labeled) of the present disclosure and an image sensor 790. The image capturing lens assembly includes, in order from an object side to an image side, a first lens element 710, a second lens element 720, a third lens element 730, an aperture stop 700, a fourth lens element 740, a fifth lens element 750, a sixth lens element 760, an IR-cut filter 770 and an image plane 780, wherein the image capturing lens assembly has a total of six lens elements (710-760) with refractive power.

The first lens element 710 with negative refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric.

The second lens element 720 with positive refractive power has an object-side surface 721 being concave in a paraxial region thereof and an image-side surface 722 being convex in a paraxial region thereof. The second lens element 720 is made of plastic material and has the object-side surface 721 and the image-side surface 722 being both aspheric.

The third lens element 730 with positive refractive power has an object-side surface 731 being concave in a paraxial region thereof and an image-side surface 732 being convex in a paraxial region thereof. The third lens element 730 is made of plastic material and has the object-side surface 731 and the image-side surface 732 being both aspheric.

The fourth lens element 740 with positive refractive power has an object-side surface 741 being convex in a paraxial region thereof and an image-side surface 742 being convex in a paraxial region thereof. The fourth lens element 740 is made of plastic material and has the object-side surface 741 and the image-side surface 742 being both aspheric.

The fifth lens element 750 with negative refractive power has an object-side surface 751 being concave in a paraxial region thereof and an image-side surface 752 being convex in a paraxial region thereof, wherein the image-side surface 752 of the fifth lens element 750 has at least one inflection point in an off-axis region thereof. The fifth lens element 750 is made of plastic material and has the object-side surface 751 and the image-side surface 752 being both aspheric.

The sixth lens element 760 with positive refractive power has an object-side surface 761 being convex in a paraxial region thereof and an image-side surface 762 being concave in a paraxial region thereof, wherein the image-side surface 762 of the sixth lens element 760 has at least one inflection point in an off-axis region thereof. The sixth lens element 760 is made of plastic material and has the object-side surface 761 and the image-side surface 762 being both aspheric.

The IR-cut filter 770 is made of glass and located between the sixth lens element 760 and the image plane 780, and will not affect the focal length of the image capturing lens assembly. The image sensor 790 is disposed on or near the image plane 780 of the image capturing lens assembly.

The detailed optical data of the 7th embodiment are shown in Table 13 and the aspheric surface data are shown in Table 14 below.

TABLE 13

7th Embodiment
f = 2.21 mm, Fno = 2.25, HFOV = 68.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.963 | ASP | 0.500 | Plastic | 1.544 | 55.9 | −4.00 |
| 2 | | 1.344 | ASP | 1.552 | | | | |
| 3 | Lens 2 | −6.496 | ASP | 1.058 | Plastic | 1.544 | 55.9 | 7.52 |
| 4 | | −2.654 | ASP | 0.073 | | | | |
| 5 | Lens 3 | −24.361 | ASP | 0.633 | Plastic | 1.544 | 55.9 | 73.89 |
| 6 | | −15.308 | ASP | 0.050 | | | | |
| 7 | Ape. Stop | Plano | | 0.460 | | | | |
| 8 | Lens 4 | 2.147 | ASP | 1.428 | Plastic | 1.544 | 55.9 | 1.79 |
| 9 | | −1.369 | ASP | 0.110 | | | | |
| 10 | Lens 5 | −0.936 | ASP | 0.516 | Plastic | 1.639 | 23.5 | −2.02 |
| 11 | | −4.153 | ASP | 0.162 | | | | |
| 12 | Lens 6 | 1.692 | ASP | 0.994 | Plastic | 1.544 | 55.9 | 8.63 |
| 13 | | 2.098 | ASP | 0.700 | | | | |
| 14 | IR-cut filter | Plano | | 0.210 | Glass | 1.517 | 64.2 | — |
| 15 | | Plano | | 0.675 | | | | |
| 16 | Image | Plano | | — | | | | |

Note:
Reference wavelength is 587.6 nm (d-line).

TABLE 14

| Aspheric Coefficients | | | | | | |
|---|---|---|---|---|---|---|
| Surface # | 1 | 2 | 3 | 4 | 5 | 6 |
| k= | −2.4546E+00 | −1.0121E+00 | 1.3690E+01 | −1.9040E+01 | 9.0000E+01 | 3.9791E+01 |
| A4= | −1.4409E−02 | −1.1117E−03 | −1.2694E−02 | 2.2879E−02 | 5.4782E−02 | −1.7665E−01 |
| A6= | 1.8446E−03 | −1.9845E−04 | 1.2869E−02 | 4.2861E−02 | −5.5494E−02 | 9.4757E−02 |
| A8= | −1.0159E−04 | 6.2529E−05 | −1.1552E−04 | −2.1746E−02 | 2.1319E−02 | −6.1702E−02 |
| A10= | 3.1436E−06 | 3.4355E−04 | −3.2092E−03 | −8.2990E−03 | −2.8898E−02 | 1.2806E−02 |
| A12= | | | 9.4406E−04 | 3.2519E−03 | | |
| Surface # | 8 | 9 | 10 | 11 | 12 | 13 |
| k= | −4.4477E+00 | −3.2573E−01 | −4.3284E+00 | −9.0000E+01 | −6.7515E+00 | −4.7054E−01 |
| A4= | −4.4958E−02 | 2.2563E−01 | 1.3537E−01 | 8.3238E−02 | −2.9054E−02 | −7.0056E−02 |
| A6= | 2.2503E−02 | −3.2332E−01 | −2.7364E−01 | −1.0167E−02 | 9.0793E−03 | 1.0528E−02 |
| A8= | −1.5988E−02 | 2.7322E−01 | 2.2612E−01 | −7.3216E−03 | −1.4399E−03 | −1.2904E−03 |
| A10= | 5.1532E−03 | −1.1284E−01 | −9.4986E−02 | 2.5926E−03 | 1.3600E−04 | −9.9499E−06 |
| A12= | | 1.9077E−02 | 1.5551E−02 | −2.2014E−04 | −6.6936E−06 | 1.9083E−05 |
| A14= | | | | −5.5074E−06 | | −1.5949E−06 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 2.21 | f/R12 | 1.05 |
| Fno | 2.25 | |f2/f3| | 0.10 |
| HFOV [deg.] | 68.0 | |f1/f2| + |f1/f3| | 0.59 |
| (R11 − R12)/(R11 + R12) | −0.11 | BL/f | 0.72 |
| |f1/R3| | 0.62 | FOV [deg.] | 136.0 |

The foregoing image capturing device 10 may be installed in but not limited to a vehicle photographing terminal, including vehicle recording cameras or rear-view cameras. Moreover, according to the present disclosure, the fifth lens element has negative refractive power, the sixth lens element has an object-side surface being convex in a paraxial region thereof and an image-side surface being concave in a paraxial region thereof, and the image-side surface of the sixth lens element has at least one inflection point in an off-axis region thereof. Accordingly, it is favorable for correcting the image distortion in a peripheral region and improving relative illumination and resolving power for the vehicle photographing terminal and the image capturing device 10.

The foregoing description, for purpose of explanation, has been described with reference to specific embodiments. It is to be noted that TABLES 1-14 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image capturing lens assembly comprising, in order from an object side to an image side:

a first lens element with negative refractive power having an image-side surface being concave in a paraxial region thereof;

a second lens element;

a third lens element;

a fourth lens element having positive refractive power, wherein an object-side surface and an image-side surface of the fourth lens element are aspheric, and the fourth lens element is made of plastic material;

a fifth lens element with negative refractive power having an object-side surface being concave in a paraxial region thereof, wherein both of the object-side surface and an image-side surface of the fifth lens element are aspheric; and a sixth lens element having an object-side surface being convex in a paraxial region thereof and an image-side surface being concave in a paraxial region thereof, wherein the image-side surface of the sixth lens element has at least one inflection point in an off-axis region thereof, and both of an object-side surface and the image-side surface of the sixth lens element are aspheric;

wherein the image capturing lens assembly has a total of six lens elements, and at least three lens elements among the first through the sixth lens elements of the image capturing lens assembly are made of plastic material;

wherein a maximal field of view of the image capturing lens assembly is FOV, and the following condition is satisfied:

120 deg.≤FOV<200 deg.

2. The image capturing lens assembly of claim 1, wherein a focal length of the first lens element is f1, a curvature radius of the object-side surface of the second lens element is R3, and the following condition is satisfied:

|f1/R3|<1.4.

3. The image capturing lens assembly of claim 2, wherein a focal length of the second lens element is f2, a focal length of the third lens element is f3, and the following condition is satisfied:

|f2/f3|<2.0.

4. The image capturing lens assembly of claim 3, wherein a maximal field of view of the image capturing lens assembly is FOV, and the following condition is satisfied:

120 deg.≤FOV<200 deg.

5. The image capturing lens assembly of claim 1, wherein the second lens element has an object-side surface being concave in a paraxial region thereof and an image-side surface being convex in a paraxial region thereof.

6. The image capturing lens assembly of claim 1, wherein the image-side surface of the fifth lens element is convex in a paraxial region thereof.

7. The image capturing lens assembly of claim 6, wherein the image-side surface of the fifth lens element has at least one inflection point in an off-axis region thereof.

8. The image capturing lens assembly of claim 1, wherein a focal length of the first lens element is f1, a focal length of the second lens element is f2, a focal length of the third lens element is f3, and the following condition is satisfied:

|f1/f2|+|f1/f3|<1.0.

9. The image capturing lens assembly of claim 1, wherein the first lens element has an object-side surface being convex in a paraxial region thereof.

10. The image capturing lens assembly of claim 1, wherein a focal length of the image capturing lens assembly is f, a curvature radius of the image-side surface of the sixth lens element is R12, and the following condition is satisfied:

0.25<f/R12<1.25.

11. The image capturing lens assembly of claim 1, wherein an axial distance between the image-side surface of the sixth lens element and an image plane is BL, a focal length of the image capturing lens assembly is f, and the following condition is satisfied:

BL/f<1.0.

12. The image capturing lens assembly of claim 1, wherein a curvature radius of the object-side surface of the sixth lens element is R11, a curvature radius of the image-side surface of the sixth lens element is R12, and the following condition is satisfied:

−0.40<(R11−R12)/(R11+R12)<0.40.

13. An image capturing device, comprising:
the image capturing lens assembly of claim 1; and
an image sensor, wherein the image sensor is located on or near an image plane of the image capturing lens assembly.

14. A vehicle photographing terminal, comprising:
the image capturing device of claim 13.

15. An image capturing lens assembly comprising, in order from an object side to an image side:
a first lens element with negative refractive power having an image-side surface being concave in a paraxial region thereof;
a second lens element has an image-side surface being convex in a paraxial region thereof;
a third lens element;
a fourth lens element having positive refractive power;
a fifth lens element with negative refractive power having an object-side surface being concave in a paraxial region thereof, wherein both of the object-side surface and an image-side surface of the fifth lens element are aspheric; and
a sixth lens element having an object-side surface being convex in a paraxial region thereof and an image-side surface being concave in a paraxial region thereof, wherein the image-side surface of the sixth lens element has at least one inflection point in an off-axis region thereof, and both of an object-side surface and the image-side surface of the sixth lens element are aspheric;
wherein the image capturing lens assembly has a total of six lens elements, a focal length of the image capturing lens assembly is f, a curvature radius of the image-side surface of the sixth lens element is R12, and the following condition is satisfied:

0.25<f/R12<1.25.

16. The image capturing lens assembly of claim 15, wherein a maximal field of view of the image capturing lens assembly is FOV, and the following condition is satisfied:

120 deg.≤FOV<200 deg.

17. The image capturing lens assembly of claim 15, wherein at least three lens elements among the first through the sixth lens elements of the image capturing lens assembly are made of plastic material.

18. The image capturing lens assembly of claim 15, wherein an axial distance between the image-side surface of the sixth lens element and an image plane is BL, the focal length of the image capturing lens assembly is f, and the following condition is satisfied:

BL/f<1.0.

19. The image capturing lens assembly of claim 15, wherein a focal length of the second lens element is f2, a focal length of the third lens element is f3, and the following condition is satisfied:

|f2/f3|<2.0.

20. The image capturing lens assembly of claim 15, wherein a focal length of the first lens element is f1, a focal length of the second lens element is f2, a focal length of the third lens element is f3, and the following condition is satisfied:

|f1/f2|+|f1/f3|<1.0.

21. The image capturing lens assembly of claim 15, wherein a curvature radius of the object-side surface of the sixth lens element is R11, the curvature radius of the image-side surface of the sixth lens element is R12, and the following condition is satisfied:

−0.40<(R11−R12)/(R11+R12)<0.40.

22. The image capturing lens assembly of claim 15, wherein the image-side surface of the fifth lens element is convex in a paraxial region thereof, and the image-side surface of the fifth lens element has at least one inflection point in an off-axis region thereof.

23. An image capturing device, comprising:
the image capturing lens assembly of claim 15; and
an image sensor, wherein the image sensor is located on or near an image plane of the image capturing lens assembly.

24. A vehicle photographing terminal, comprising:
the image capturing device of claim 23.

* * * * *

UNITED STATES PATENT AND TRADEMARK OFFICE
CERTIFICATE OF CORRECTION

PATENT NO. : 9,602,731 B2
APPLICATION NO. : 14/196621
DATED : March 21, 2017
INVENTOR(S) : Cheng-Chen Lin et al.

Page 1 of 1

It is certified that error appears in the above-identified patent and that said Letters Patent is hereby corrected as shown below:

On the Title Page

Under Abstract "24 Claims, 15 Drawing Sheets" should read -- 23 Claims, 15 Drawing Sheets --.

In the Claims

In Column 27, Claim 4, Lines 1-5, delete "4. The image capturing lens assembly of claim 3, wherein a maximal field of view of the image capturing lens assembly is FOV, and the following condition is satisfied:
120 deg. $\leq$ FOV < 200 deg.", therefor.

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*